(12) United States Patent
Warren et al.

(10) Patent No.: US 7,730,150 B2
(45) Date of Patent: Jun. 1, 2010

(54) SYSTEM AND METHOD FOR IMPROVED CLIENT SERVER COMMUNICATIONS OF EMAIL MESSAGES

(75) Inventors: Joseph R. Warren, Renton, WA (US); Karl Froelich, Shoreline, WA (US); Remi A. Lemarchand, Redmond, WA (US); Nicole A. Bonilla, Redmond, WA (US); Robert R. Novitskey, Redmond, WA (US); Ronald E. Gray, Redmond, WA (US); Aaron Hartwell, Duvall, WA (US); Brendan Power, Seattle, WA (US); Brent Curtis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 12/013,281

(22) Filed: Jan. 11, 2008

(65) Prior Publication Data
US 2008/0126496 A1     May 29, 2008

Related U.S. Application Data

(62) Division of application No. 10/366,972, filed on Feb. 14, 2003, now Pat. No. 7,366,760.

(60) Provisional application No. 60/437,869, filed on Jan. 3, 2003.

(51) Int. Cl.
*G06F 15/16* (2006.01)
*G06F 12/00* (2006.01)

(52) U.S. Cl. .......................... 709/206; 709/207
(58) Field of Classification Search ............... 709/206, 709/207, 217–219, 236, 250
See application file for complete search history.

(56) References Cited

U.S. PATENT DOCUMENTS 5,923,846 A    7/1999    Gage et al.

(Continued)

FOREIGN PATENT DOCUMENTS

CA    2329891 A1    6/2002

(Continued)

OTHER PUBLICATIONS

Birrell et al., "Implementing Remote Procedure Calls," *ACM Transactions on Computer Systems*, vol. 2, No. 1, pp. 39-59 (Feb. 1984).

(Continued)

*Primary Examiner*—Zarni Maung
(74) *Attorney, Agent, or Firm*—Merchant & Gould P.C.

(57) ABSTRACT

A system and method for improved client and server communications, more particularly, an improved protocol that may be used for communication between a client and a server, such as in an email environment. Many features are provided for improved communications. An email server may provide the best message body available for an email message, may transfer an entire data object if requested property or properties are not well defined within the data object, may provide progress data for use in tracking download progress, and may send error information for a data object having an error. Email changes may be optimized at an email server component, even if the email changes occurred at another email server component. An email server may maintain a table of changes that occur to folders at an associated data store, and may notify a subscribed email client component of changes that occur in the table.

18 Claims, 23 Drawing Sheets

U.S. PATENT DOCUMENTS

| | | | |
|---|---|---|---|
| 6,073,137 A | 6/2000 | Brown et al. | |
| 6,134,582 A | 10/2000 | Kennedy | |
| 6,151,643 A | 11/2000 | Cheng et al. | |
| 6,167,402 A | 12/2000 | Yeager | |
| 6,233,318 B1 | 5/2001 | Picard et al. | |
| 6,324,544 B1 | 11/2001 | Alam et al. | |
| 6,324,587 B1 | 11/2001 | Trenbeath et al. | |
| 6,377,978 B1 | 4/2002 | Nguyen | |
| 6,449,634 B1 | 9/2002 | Capiel | |
| 6,529,685 B2 | 3/2003 | Ottesen et al. | |
| 6,629,130 B2 | 9/2003 | Mertama et al. | |
| 6,639,687 B1 | 10/2003 | Neilsen | |
| 6,684,088 B1 | 1/2004 | Halahmi | |
| 6,868,143 B1 | 3/2005 | Menon et al. | |
| 6,917,965 B2 | 7/2005 | Gupta et al. | |
| 6,934,734 B2 | 8/2005 | Lakhdhir | |
| 7,043,548 B2 | 5/2006 | Bouet | |
| 7,366,760 B2 | 4/2008 | Warren et al. | |
| 7,386,590 B2 | 6/2008 | Warren et al. | |
| 2001/0005864 A1 | 6/2001 | Mousseau et al. | |
| 2001/0054115 A1 | 12/2001 | Ferguson et al. | |
| 2002/0010746 A1 | 1/2002 | Jilk, Jr. et al. | |
| 2002/0093923 A1 | 7/2002 | Bouet | |
| 2002/0138581 A1* | 9/2002 | MacIntosh et al. | 709/206 |
| 2002/0140989 A1* | 10/2002 | Shinchi et al. | 358/402 |
| 2002/0184224 A1 | 12/2002 | Haff et al. | |
| 2002/0188683 A1* | 12/2002 | Lytle et al. | 709/206 |
| 2002/0188689 A1* | 12/2002 | Michael | 709/206 |
| 2003/0177171 A1 | 9/2003 | Brown et al. | |
| 2003/0229644 A1* | 12/2003 | Natarajan et al. | 707/102 |
| 2003/0231207 A1 | 12/2003 | Huang | |
| 2004/0068544 A1 | 4/2004 | Malik et al. | |
| 2008/0208998 A1 | 8/2008 | Warren et al. | |

FOREIGN PATENT DOCUMENTS

| | | |
|---|---|---|
| EP | 0 924 921 A1 | 6/1999 |
| EP | 0981231 A1 | 2/2000 |
| EP | 1291770 A2 | 3/2003 |
| JP | 63-205747 | 8/1988 |
| JP | 10-243461 | 9/1998 |
| JP | 11-68987 | 3/1999 |
| JP | 2000-215122 | 8/2000 |
| JP | 2001-339422 | 12/2001 |
| JP | 2002-208959 | 7/2002 |
| JP | 2002-359649 | 12/2002 |
| RU | 2 095 857 C1 | 11/1997 |
| WO | WO 93/25962 | 12/1993 |
| WO | 9413086 A1 | 6/1994 |
| WO | WO 99/57619 | 11/1999 |
| WO | WO 00/11585 | 3/2000 |
| WO | 0057612 A | 9/2000 |
| WO | WO 01/27774 A1 | 4/2001 |
| WO | 0179319 A2 | 10/2001 |
| WO | 0221749 A | 3/2002 |
| WO | WO 02/28038 A1 | 4/2002 |
| WO | WO 02/084520 A1 | 10/2002 |

OTHER PUBLICATIONS

Srinivasan, "RPC: Remote Procedure Call Protocol Specification Version 2," 19 pages (Aug. 1995).
European Search Report mailed Apr. 16, 2004 in EP 03029810.3.
Nieplocha et al., "ARMCI: A Portable Remote Memory Copy Library for Distributed Array Libraries and Computer Run-Time Systems," pp. 533-546 (Apr. 12-16, 1999).
"imapd.dist.in" Double Precision, Inc., 6 pages (Jun. 12, 2002).
Melnikov, "Synchronization Operations for Disconnected IMAP4 Clients," 20 pages (Aug. 2002).
Honeycutt, "Using the Internet," 3 pages (1997) (with English Translation).
Office Action mailed Apr. 19, 2006 in U.S. Appl. No. 10/673,273.
Office Action mailed Oct. 27, 2006 in U.S. Appl. No. 10/366,972.
Office Action mailed Nov. 16, 2006 in U.S. Appl. No. 10/367,161.
Final Office Action mailed Jan. 25, 2007 in U.S. Appl. No. 10/367,273.
Office Action mailed Apr. 20, 2007 in U.S. Appl. No. 10/366,972.
Office Action mailed Jun. 14, 2007 in U.S. Appl. No. 10/367,273.
Final Office Action mailed Aug. 14, 2007 in U.S. Appl. No. 10/367,161.
Office Action mailed Feb. 5, 2008 in U.S. Appl. No. 10/367,161.
Goldsmith, A Mail-Safe transformation Format of Unicode, Internet Engineering Task Force, May 1997, 16 pp.
Satyanarayanan et al., (Eds.), "In the RPC2 Reference Guide and Manual," Chapter 4, pp. 37-62 (Carnegie Mellon University, Pittsburgh, PA, May 2002).
Bisdikian, "Performance Analysis of Single-Stage, Output Buffer Packet Switches with Independent Batch Arrivals," Computer Networks and ISDN Systems, vol. 27, No. 5, pp. 627-652 (1995).
Crispin, "Internet Message Access Protocol," Version 4, Rev. 1, pp. 1-71 (Dec. 1996).
Myers et al., "Post Office Protocol," Version 3, pp. 1-23 (May 1996).
Office Action mailed Jun. 25, 2009 in U.S. Appl. No. 12/109,077.

* cited by examiner

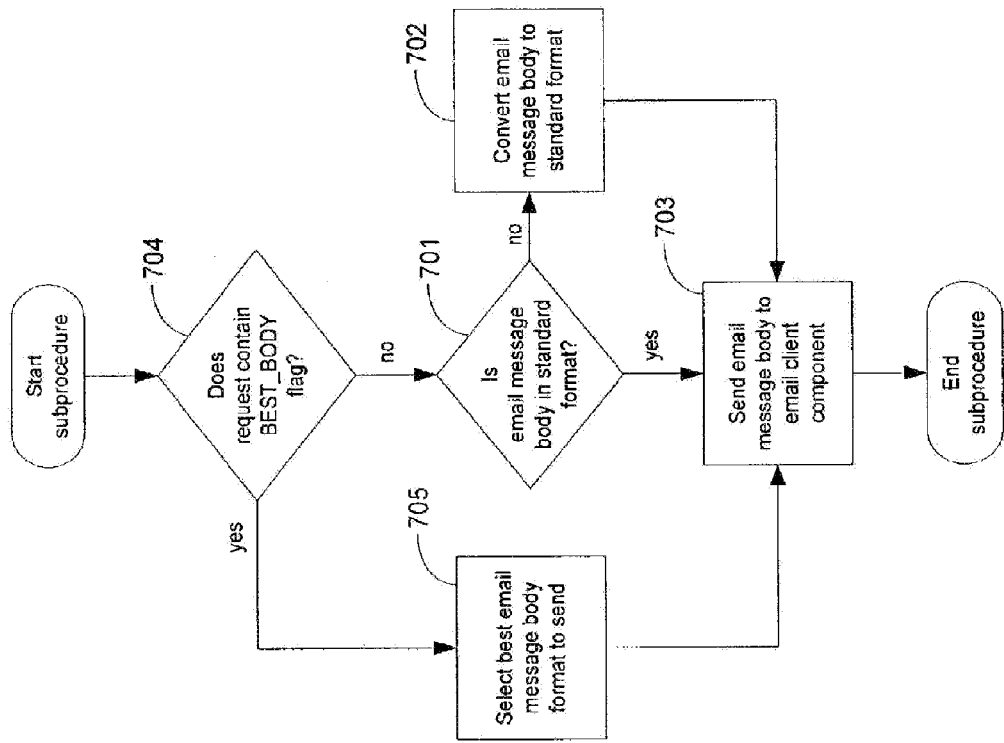
FIG 7B
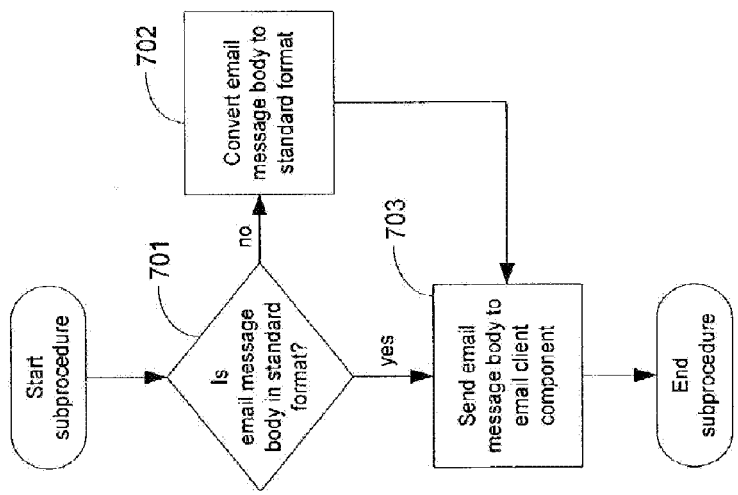
FIG 7A - PRIOR ART

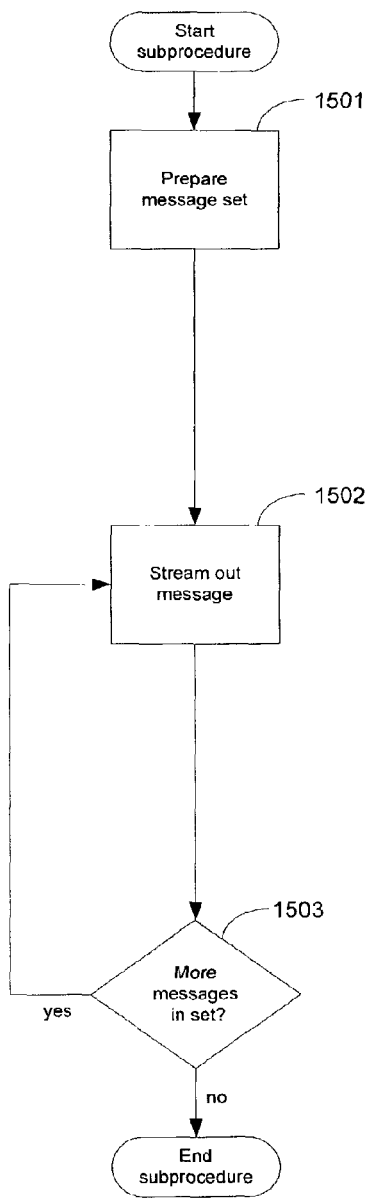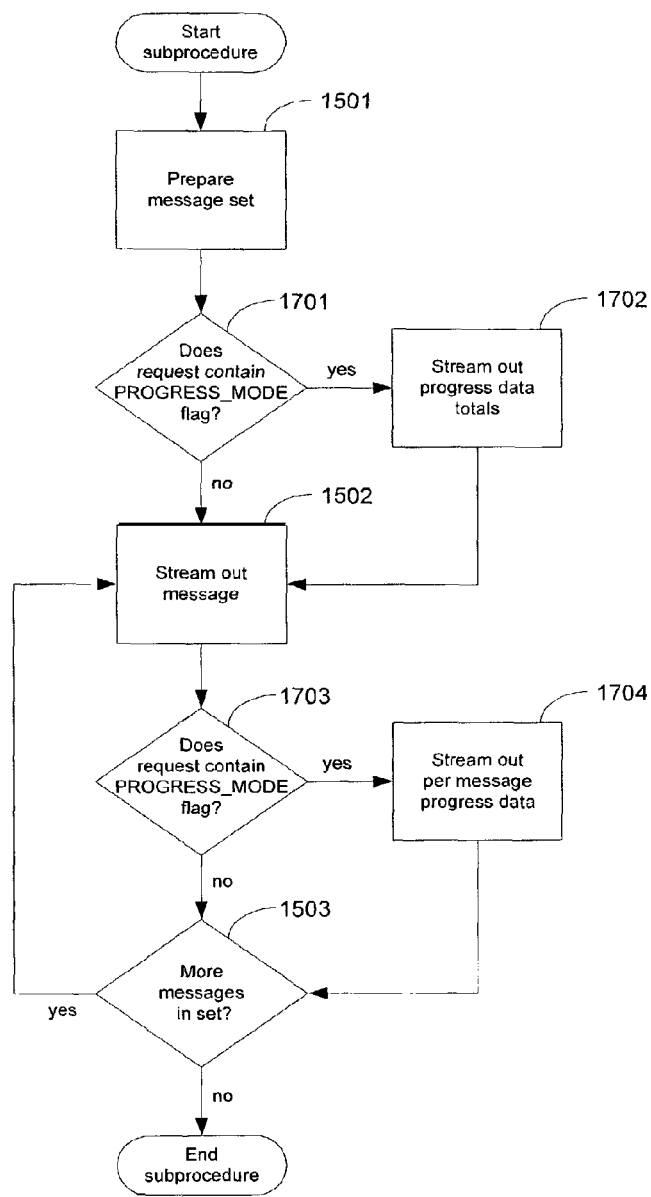
FIG 17A
FIG 17B

SYSTEM AND METHOD FOR IMPROVED CLIENT SERVER COMMUNICATIONS OF EMAIL MESSAGES

REFERENCE TO RELATED APPLICATION

This application is a divisional of U.S. application Ser. No. 10/366,972, filed on Feb. 14, 2003, which claims the benefit of U.S. application Ser. No. 60/437,869, filed Jan. 3, 2003, the entire disclosures of which are incorporated herein by reference.

FIELD OF THE INVENTION

This invention pertains generally to computer networks, and more particularly, to methods for communicating between client and server applications such as email applications.

BACKGROUND OF THE INVENTION

Email has become an important method for communicating. Email systems typically include a server component (e.g., Microsoft Exchange Server) and a client component (e.g., Microsoft Outlook or Microsoft Outlook Express). These components are typically software applications that are configured to execute on computing devices (e.g., servers, PCs, laptops, and PDAs).

Often, in order to facilitate communications, a client and server, such as client component and a server component of an email system, agree on a communications protocol. The protocol sets out the rules defining the expected behavior of each party during communications, for example, the expected sequence of request and response. Sophisticated protocols have rules for handling unexpected behavior.

As client and server components are improved, the improved versions are distributed to end users. In order to take advantage of new component features and network features, it is often the case that a new communications protocol is invented. Where the installed base of server components is significant, a client component may have the ability to communicate, via a set of protocols, with selected previous versions of server components.

It is sometimes the case that later protocols build upon earlier protocols rather than replacing them wholesale. In such a case, a later protocol may be built of protocol elements which can be enabled or disabled in order to simulate earlier protocols. Likewise, where the installed base of client components is significant, a server component may have the ability to communicate, via a protocol, with selected previous versions of client components.

The invention provides such a system and method. These and other advantages of the invention, as well as additional inventive features, will be apparent from the description of the invention provided herein.

SUMMARY OF THE INVENTION

The present invention provides a system and method for improved client and server communications. More particularly, the invention is directed to an improved protocol that may be used for communication between a client and a server. The invention has particular relevance to an email server environment, but the features described herein may be utilized in other client and server networks.

In accordance with one aspect of the present invention, an email client component may indicate to an email server component that it is interested in receiving the best message body available for an email message. The email server component may receive a request for a message, the request having an indication that a best message body of the mail is desired. The email server component may access a data store associated with the email server component and determine the best message body of the message that is available independent of converting the format of available message bodies, and retrieve and return the best message body without converting the format of the best message body. As such, the processing time at the email server component is reduced, because a conversion of the email body does not occur at the email server component.

In accordance with another aspect of the present invention, an email server component may, upon a request for a transfer of a particular property or set of properties (e.g., headers), transfer an entire data object if the property or properties are not well defined within the data object. An email client component generates a request for data objects in a folder, the request including an indication that at least one property of the data objects is desired. The email server component receives the request, and accesses the folder and data objects in the folder. For each data object in the folder, if the at least one property is well defined in the data object, the email server component retrieves and returns the at least one property for that data object to the email client component. If the at least one property is not well defined for the data object, the email server component retrieves and returns the data object to the email client component.

In accordance with yet another aspect of the present invention, an email client component may force an email server component to supply an email message in Unicode. The email client component sends a request for at least one email message and an indication that the email client component desires for email messages to be in Unicode format. The email server component, in response to receiving the request and indication, retrieves the at least one message, and, for each email message, if the email message is available in Unicode format, provides the Unicode format to the email client component. If the email message is not available in Unicode format, the email server component converts the email message to Unicode format and provides the Unicode format to the email client component.

In accordance with still another aspect of the present invention, a request send by an email client component may indicate no limit for the size of a response to the request, allowing an email server component to fill a buffer, if needed. The email client component sends a plurality of subrequests within a request, each of the subrequests requesting an operation at an email server component and including size information. In response to each subrequest, if the size information includes a size limit inside a range expected by the email server component, then the email server component limits a response to the size limit. If the size information includes a size limit outside a range expected by the email server component, then the email server component looks for a new size limit in the size information. The new size limit may be arbitrary, such as "fill the available buffer."

BRIEF DESCRIPTION OF THE DRAWINGS

FIG. 7A is a flowchart depicting an example procedure for sending an email message body to an email client component.

FIG. 7B is a flowchart depicting a procedure for sending an email message body to an email client component in accordance with an aspect of the present invention.

FIG. 17A is a flowchart depicting a procedure for streaming out a set of messages.

FIG. 17B is a flowchart depicting a procedure for streaming out a set of messages along with progress information in accordance with an aspect of the present invention.

DETAILED DESCRIPTION OF THE INVENTION

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, tablet PCs, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
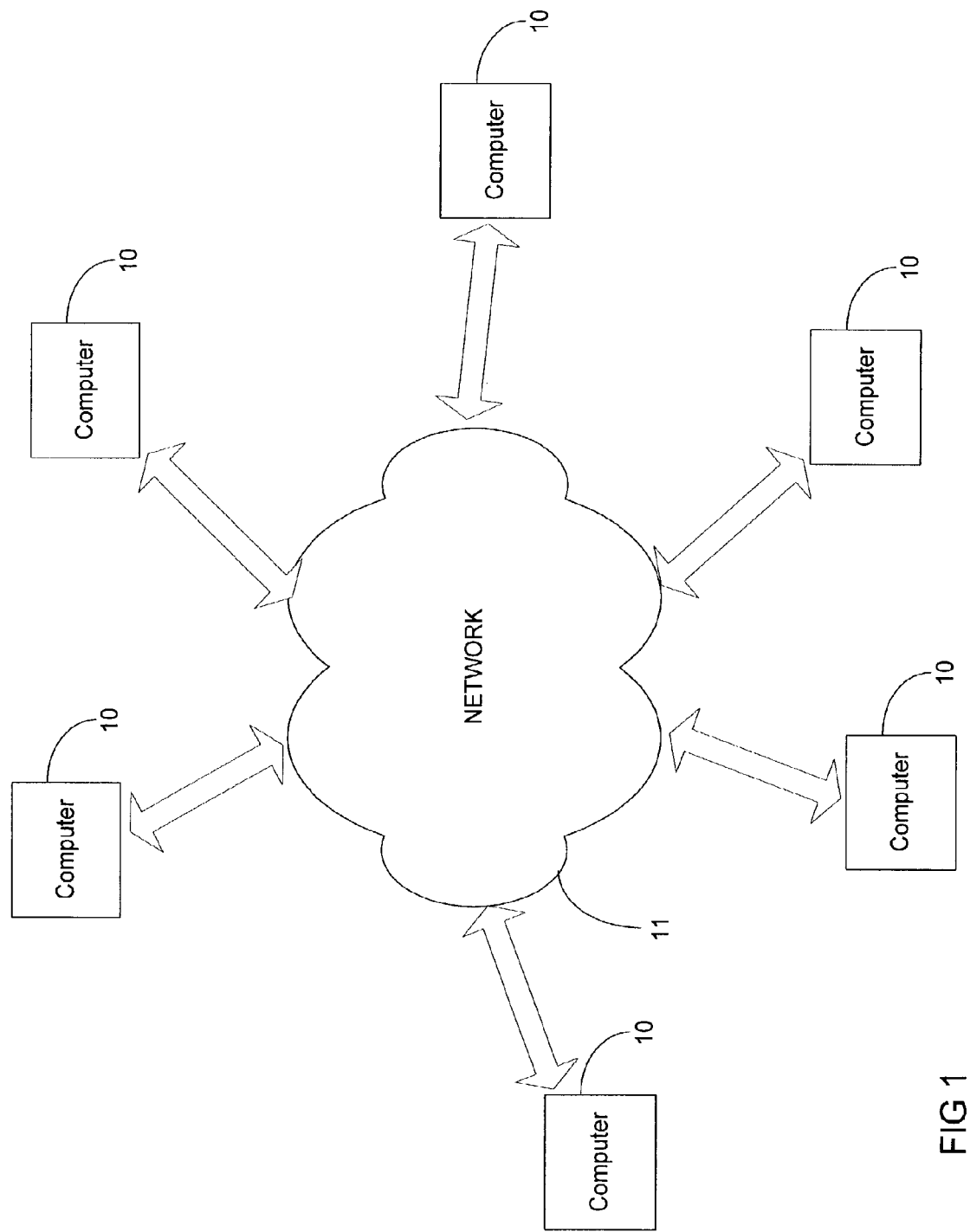
FIG. 1 is a schematic diagram of computers connected by a network.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another over the network 11, one or more of the computers may act as clients, servers or peers with respect to other computers. Accordingly, the various embodiments of the invention may be practiced on clients, servers, peers or combinations thereof, even though specific examples contained herein do not refer to all of these types of computers.

Figure 2:
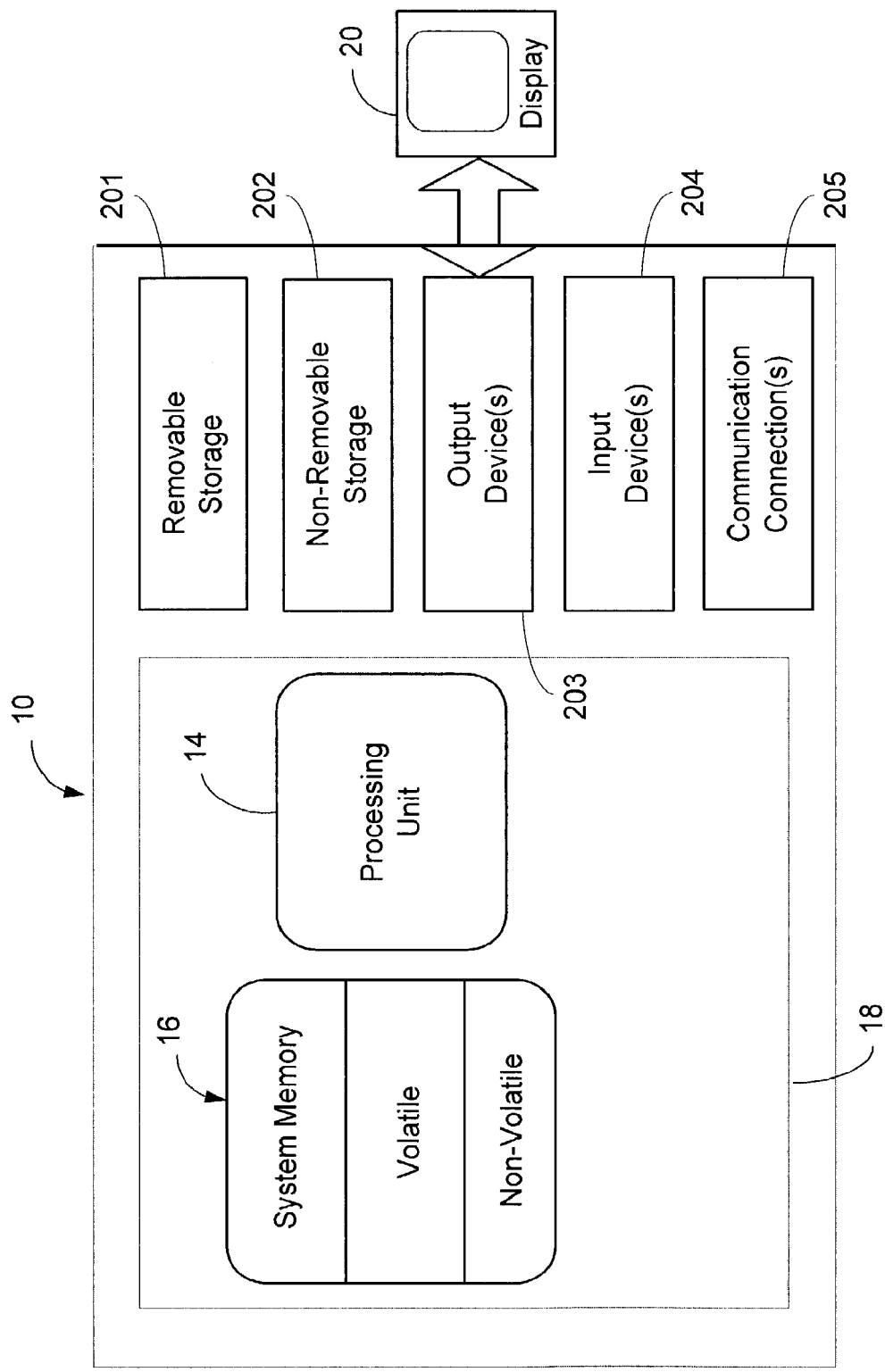
FIG. 2 is a schematic diagram illustrating an exemplary computer system usable to implement an embodiment of the invention.

Referring to FIG. 2, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (removable 201 and/or non-removable 202) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 preferably also contains communications connections 205 that allow the device to communicate with other devices. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wired media such as a wired network or direct-wired connection, and wireless media such as acoustic, RF, infrared and other wireless media. The term "computer-readable medium" as used herein includes both computer storage media and communication media.

Computer 10 may also have input devices 204 such as a keyboard, mouse, pen, voice input device, touch input device, etc. Output devices 203 such as a display 20, speakers, a printer, etc. may also be included. All these devices are well known in the art and need not be discussed at length here.

The present invention is directed to a system and method for improved client and server communications, and more particularly is directed to an improved protocol that may be used for communication between a client and a server. The invention has particular relevance to an email server environment, but the features described herein may be utilized in other client and server networks. For ease of description, however, the invention is described with reference to a client/server email environment.

Figure 3:
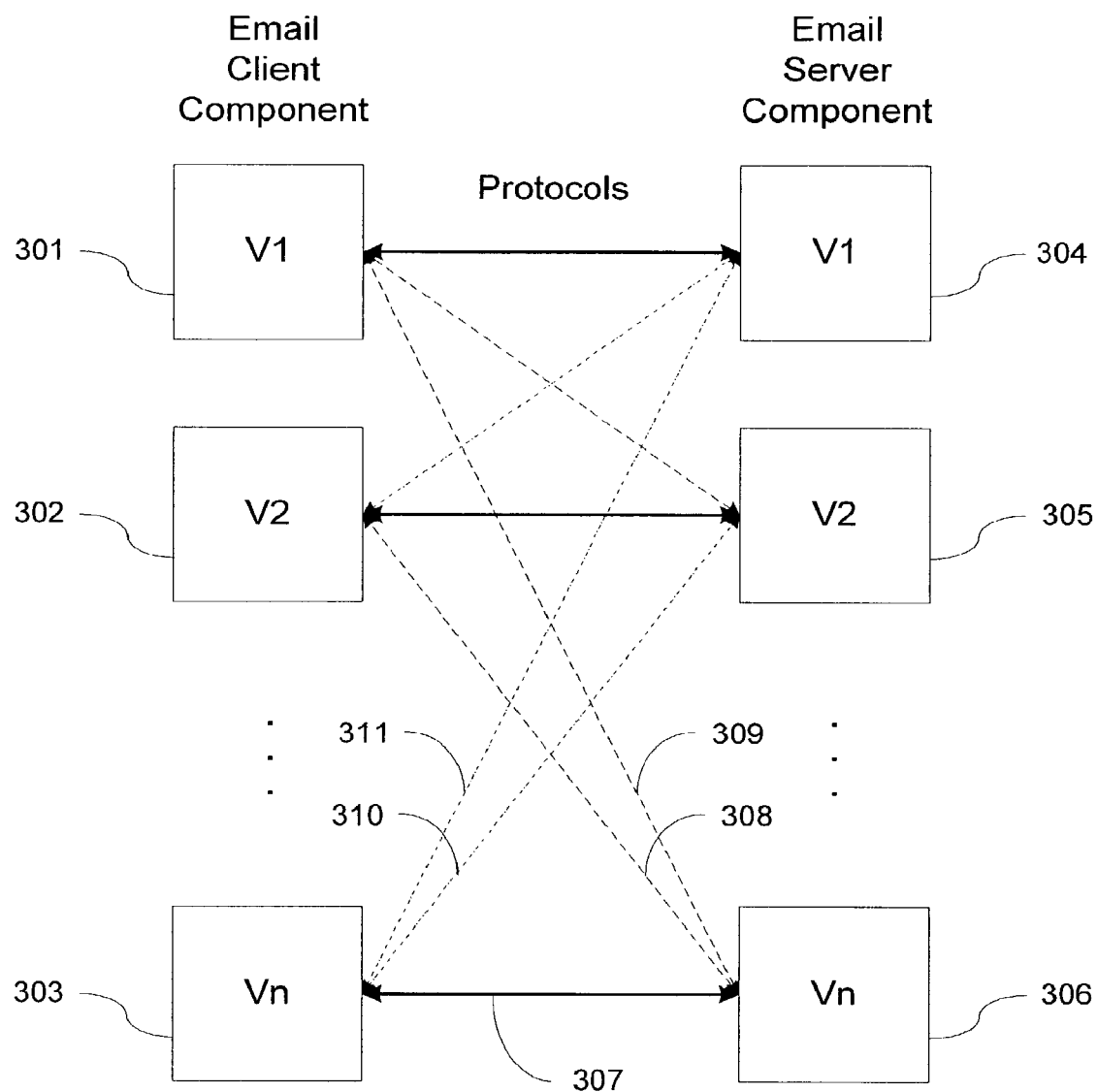
FIG. 3 is a schematic diagram depicting an environment with multiple versions of both email client components and email server components.

The present invention may be implemented in a client/server environment having two or more versions of client applications or components, and/or two or more versions of server applications or components. To this end, FIG. 3 illustrates a block diagram showing multiple versions of both client and server components in a network email environment. In general, the client and server components are configured so that they are backwardly compatible. That is, a client component is capable of communicating with recent and legacy versions of server components, and vice versa. A set of protocols are established to communicate between the multiple versions. The set of protocols may constitute several different protocols, each being self-contained. Alternatively, a set of protocol components may be available, and particular components are used to configure particular protocols within the protocol set.

In any event, in the network email environment shown in FIG. 3, a most recent version email client component 303 communicates best with a most recent version email server component 306 using a protocol 307. However, the most recent email server component 306 is also capable of communicating with selected previous version email client components, for example, email client component 302 and email client component 301, using other protocols (e.g., protocols 308 and 309 in FIG. 3) in a protocol set. Email client component 303 is also able to communicate with selected previous version email server components, for example, email server component 305 and email server component 304, using protocols such as the protocols 310 and 311.

Generally, as used herein, for the purposes of describing the protocol of the present invention, a "most recent" email (server or client) component, or a most recent version of an email (server or client) component, is a server or client component that is aware of the new feature or features being described, and can utilize, implement, and/or act on those features. Although the terms are used throughout this document to describe client and server components that are aware of the various aspects of the protocol of the present invention, the terms also include components that are aware of only the particular aspect being described, or more than one aspect being described. Likewise, a "previous" email component or previous version of an email component is a component that is not aware of, and cannot act upon the aspects of the protocol of the present invention.

Figure 4:
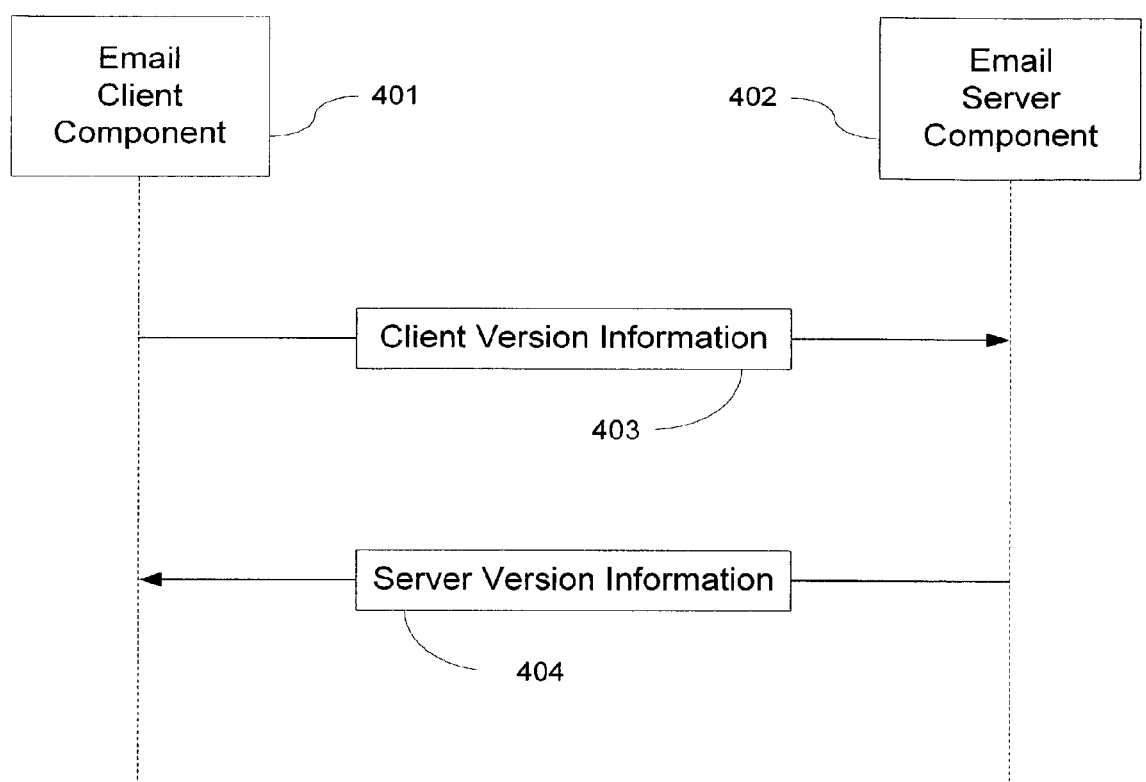
FIG. 4 is a protocol diagram showing an example of a protocol negotiation procedure between an email client component and an email server component.

A protocol negotiation procedure is often used to establish a protocol between a client and a server (e.g., the most recent version email server component 306 and the most recent version email client component 303). Although such protocol negotiations are known, a brief description of a protocol negotiation procedure between email client component 401 (FIG. 4) and email server component 402 (also FIG. 4) is provided for the benefit of the reader. Early in a communication session between email client component 401 and email server component 402, email client component 401 sends email server component 402 a message 403 that includes client version information, for example, in the form of a client component version stamp. Email server component 402 responds to message 403 with message 404 that includes server version information, for example, in the form of a server component version stamp.

The client and server version information may be used in a variety of ways to attempt to establish communication between the email client component 401 and the email server component 402. For example, version information may be used to select a suitable protocol for continued communications, or to determine if further communications are even possible. In establishing a protocol, version information may be used to enable and/or disable specific available protocol aspects or components, for example.

An email server component may receive and process requests from multiple email client components in parallel. Where a single client is shown, unless explicitly stated otherwise, it is merely to simplify the figures and accompanying explanation.

The email network of the present invention utilizes request and response exchanges to pass queries and data between client and server components in the network. In practice, the performance of a protocol may be effected by the underlying communications network transport mechanism used to implement communications between clients and servers in an email network. For example, in an email network that uses remote procedure calls (RPCs) as the underlying communications network transport mechanism, it may be much more efficient to make a single remote procedure call of larger size (e.g., 32 KB) than to make several remote procedure calls of smaller size (e.g., 2 KB). One way known to improve performance in such an email network is to buffer multiple requests and/or responses for transmission in a single remote procedure call.

Figure 5:
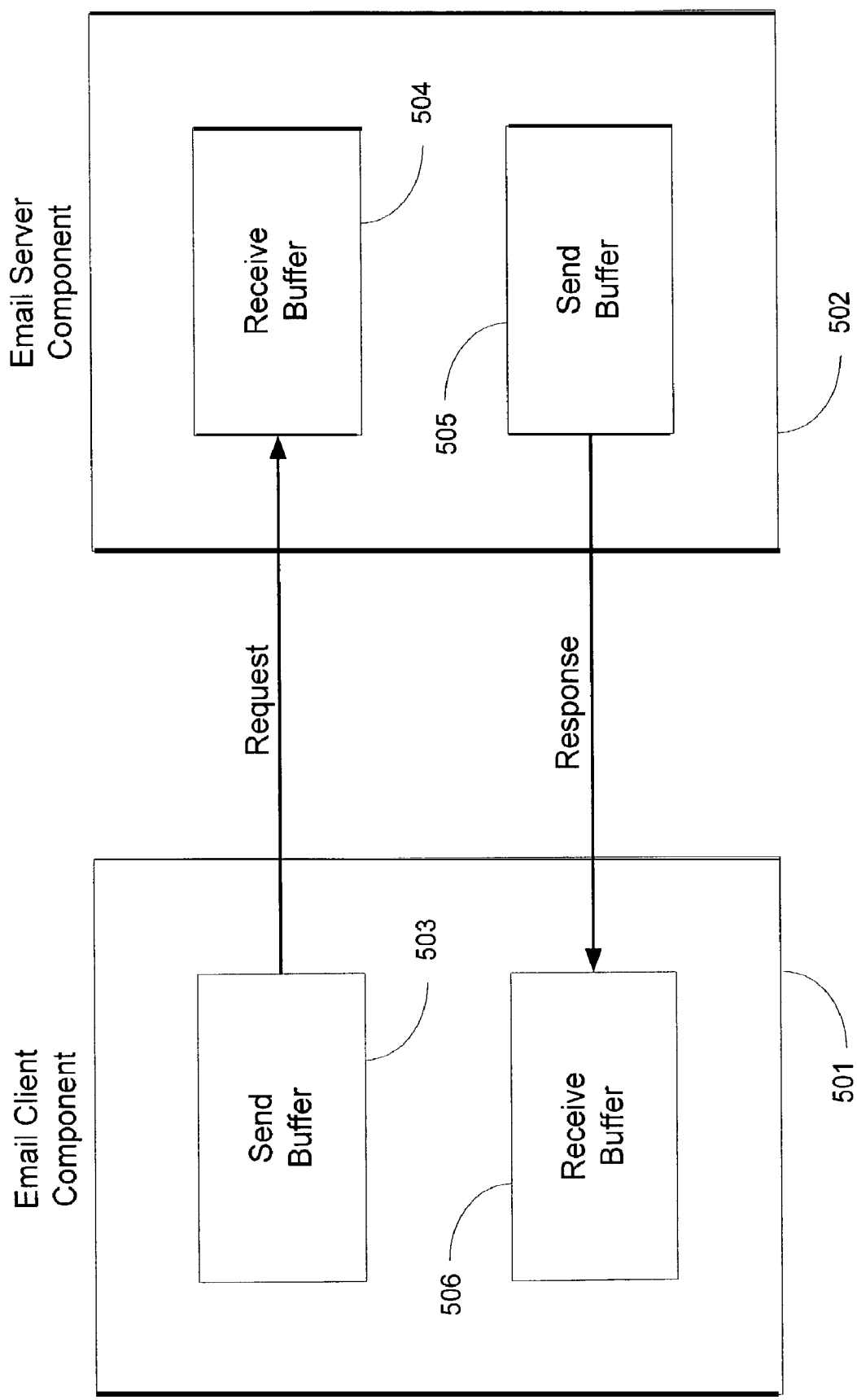
FIG. 5 is a schematic diagram showing an example email network in which email client components and email server components have fixed size communication buffers.

As an example, FIG. 5 shows a request and response exchange between an email client component 501 and an email server component 502. The email client component 501 and the email server component 502 each have fixed sized communication buffers 503, 504, 505 and 506. The buffers 503, 504, 505 and 506 are reserved areas of memory for temporarily holding data. Email client component 501 begins a request-response cycle by filling buffer 503 with one or more sub-requests or remote operations (ROPs) before transmitting the contents of the buffer 503 to buffer 504.

After being received in the buffer 504, each ROP is processed in order by email server component 502 and the corresponding result written to buffer 505. Each ROP does produce some result. The result may include data requested by email client component 501, for example, a particular set of email messages. Email server component 502 monitors buffer 505 and when it is nearly full (e.g., less than 8 KB remaining), email server component 502 writes any unprocessed ROPs to the end of buffer 505 and transmits buffer 505 to buffer 506. Email client component 501 then begins a new request-response cycle by writing unprocessed ROPs to buffer 503 for resubmission to email server component 502 when buffer 503 becomes full again.

The size of a response is typically larger on average than the size of a request. For this reason, the size of response buffers 505 and 506 are typically configured to be larger than the size of request buffers 503 and 504. In one embodiment of the invention, the optimal size of the response buffers 505 and 506 was determined to be 96 KB for a size of 32 KB for request buffers 503 and 504, a ratio of 3 to 1. In one embodiment, the email client component is capable of configuring the size of any of the buffers 503, 504, 505 and 506.

Some email networks that utilize buffers, for example the email network shown in FIG. 5, may employ a fast transfer mode between an email client component and an email server component. Fast transfer mode includes requests, such as ROPs, by a client that are divided into at least two kinds: requests that result in an initialization of a fast transfer data source at the server, and requests that result in the efficient transfer of data from the fast transfer data source to the client. The fast transfer data source may be, for example, a database table. The fast transfer data source serves as a ready temporary store of data that enables later requests for the data to be serviced with less delay than would otherwise be possible. Sometimes the second kind of fast transfer mode request seeks to achieve efficient transfer of data by explicitly specifying the size of the response, for example, the size of the response may be set to the size of the entire client receive buffer less response overhead.

Figure 6A:
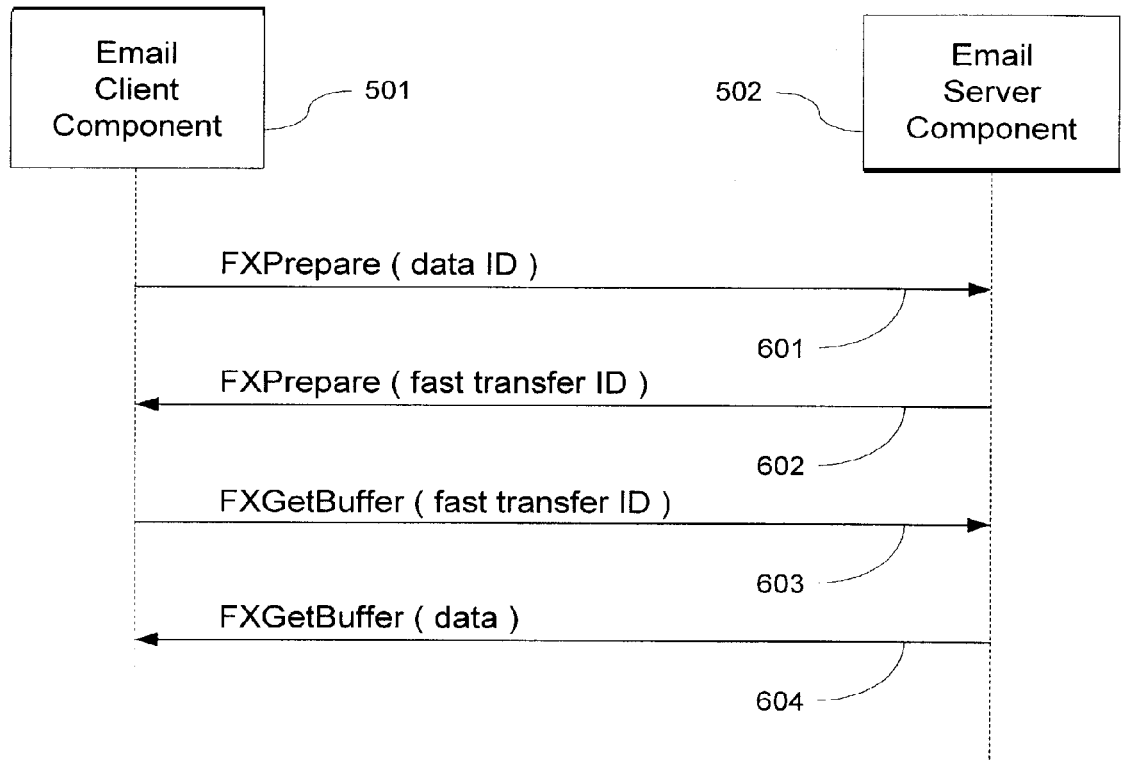
FIG. 6A is a protocol diagram showing an example protocol requiring two request-response cycles to complete a fast transfer operation.

FIG. 6A shows a fast transfer operation having at least two request-response cycles. In a first request 601 a ROP (e.g., FXPrepare) initializes a fast transfer data source on server 502. At the server, only FXPrepare is processed (i.e., the fast transfer data source is initialized) and its result is returned in a first response 602. In a second request 603 a ROP (e.g., FXGetBuffer) requests the server to fill the buffer 505 from the fast data source. The server empties the fast data source into the buffer, and returns the result in a second response 604. If the output buffer 505 for the email server component fills before the fast data source is emptied, additional FXGetBuffer ROPs may be required.

Figure 6B:
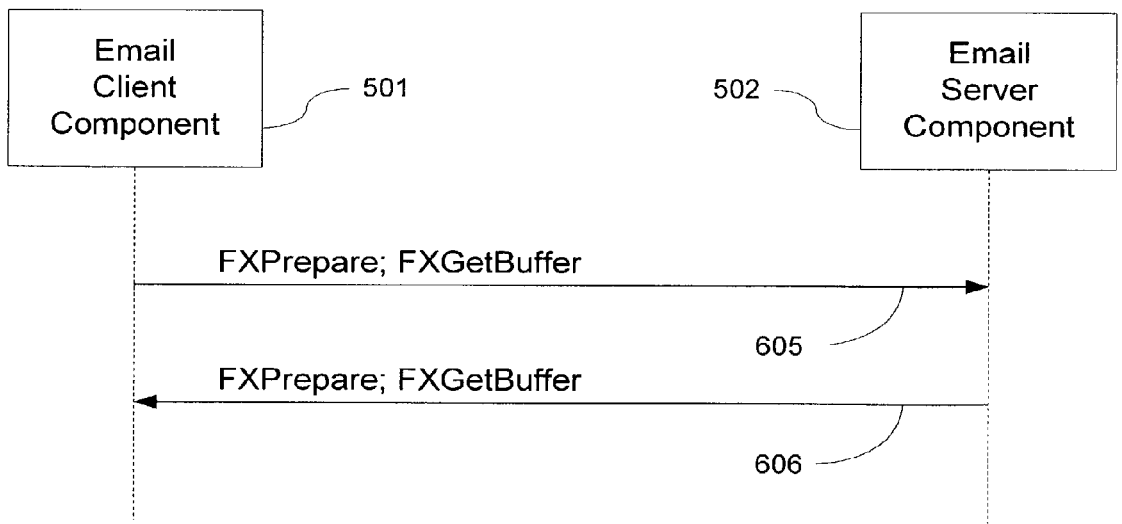
FIG. 6B is a protocol diagram showing an example protocol requiring a single request-response cycle to complete a fast transfer operation.

FIG. 6B shows a fast transfer operation having only a single request-response cycle. In a first request 605, both FXPrepare and FXGetBuffer are processed by email server component 502 and the results of both operations are returned in first response 606. The result of FXPrepare is available to FXGetBuffer at email server component 502 because part of each buffer 503, 504, 505 and 506 is explicitly defined as a shared data table. It is desirable to reduce the number of request-response cycles because it results in a more efficient transfer of data. A fast transfer operation having more than only a single request-response cycle may occur when buffer 505 is too full to hold the result of an FXGetBuffer ROP.

It will be appreciated that the ROPs of FIGS. 6A and 6B and like figures throughout this application are schematic in that they may be implemented in practice by a series of ROPs, unless specifically stated otherwise.

Typically, the size of a ROP result is different from the size of a ROP request. It is not always possible to predict the size of a ROP result. When data compression techniques are used to reduce the size of a ROP result, it is even more difficult to predict the size of a ROP result. Not being able to predict the size of a ROP result can prevent manual tuning of a protocol to minimize the number of request-response cycles required to complete particular client operations, for example, to ensure that all new messages are downloaded to the client in a single request-response cycle. Manual tuning of a protocol includes manually configuring the sequence and/or size of protocol requests, responses and/or ROPs.

In accordance with one aspect of the present invention, the number of request-response cycles is automatically minimized by specifying that key ROPs (e.g., FXGetBuffer) are free from the requirement to predict the size of their result. Instead, such ROPs are processed by email server component 502 until the limit of buffer 505 (which is the same as buffer 506) is reached.

As an example, in an environment that includes multiple versions of email server components, separate ROPs may be defined for previous version server components and recent version server components. The recent versions are free from the requirement to predict the size of their result. The characteristics for these ROPs are set forth in the following table:

|  | ROP that may be used by a protocol for communicating with previous version servers | ROP that may be used by a protocol for communicating with most recent version servers |
| --- | --- | --- |
| ROP ID | FXGetBuffer | FXGetBuffer |
| Parameters used in multiple modes | Required size: the size that the server must reserve in its output buffer. | Required size: is set to a value beyond the maximum expected by the previous version, for example, to a value greater than 32 KB. This signals the server to look for the new size limit parameter. |
| New parameters | n/a | Size limit: informs the server of the limit up to which the server may fill its output buffer. |

The ROPs for previous version server components are similar in construction to existing, prior art ROPs. That is, the ROPs predict and dictate a size in the output buffer (e.g., send buffer 505) that must be reserved for holding a response. In contrast, the dictated size for the output buffer for a most recent version of a server component is not predicted, but instead is set to a value beyond the maximum expected by the previous version server components, for example, to a value greater than 32KB. The fact that the size of the output buffer is defined beyond a value expected by the server component signals the server component to look for a new size limit parameter, which may be, for example, a filling of the output buffer for the server component. These characteristics automatically minimize the number of request-response cycles, with only a small increase in the complexity of an email server component that processes the ROPs Note that the order of parameters shown in the table above and in like tables throughout this application do not necessarily correlate with the order that, for example, the parameters are transmitted over the network or stored in memory by either an email client component or an email server component, unless accompanied by an explicit statement to the contrary. In addition, unchanged parameters may be omitted for the sake of clarity.

In an email network, one of the typical duties of a protocol is to achieve the transfer of data objects, for example, email messages, between email client components and email server components. Further examples of such data objects include email folders which may contain email messages and other data objects, and folder associated information (FAI) data objects which may, for example, contain rules for processing email messages, or define how the data objects contained by a folder will be displayed. Data objects may be opaque to an email client component; that is, an email client component may have no means of interpreting the contents of the data object. Alternatively, data objects may be composed of named properties, for example, an email message may comprise properties named "to," "from," "subject," "importance," "body 1," "body 2," "body 3," "attachment 1," "attachment 2," and so on.

One advantage of email networks where data objects may be composed of named properties over email networks where data objects are opaque is the potential to improve protocol performance because of the ability of a protocol to transfer only part of a data object. Having named properties permits particular properties of the data object to be transmitted without transmitting the entire data object.

For example, an email message may be composed of a set of header properties and a set of body properties. The needs of an email client component may be such that a protocol may transfer the header properties first and then the body properties later or not at all. This feature permits a user to view the header information for several messages prior to the entirety of all the messages being downloaded. Using this feature, a more fine-grained control over bandwidth utilization may be obtained by the client component, which may positively effect protocol performance. In addition, a client component may use this feature to result in lower bandwidth utilization (for example, bodies may be downloaded for only selected headers), which is particularly desirable in low bandwidth environments.

The performance of the protocol does not necessarily increase if the server component is configured to send body and header properties in two separate request-response cycles (i.e., one each for the header and the body). For example, if the needs of the email client component were such that it required both header and body properties at the same time, then the performance of the protocol might be decreased verses a situation where a single request-response cycle could retrieve both the header and the body. Thus, the simple act of enabling data objects to be composed of named properties is not itself enough to automatically result in improved protocol performance. Achieving improved protocol performance does depend on the choice of properties that may make up a data object and how they may be used by a protocol. That choice may depend on a number of factors including the needs of most recent and previous version email client components, and the needs of most recent and previous version email server components. Examples of email client component needs include satisfying different levels of urgency for the display of different information and complying with preferences set by an email client component user. Examples of email server component needs include efficient storage and retrieval of data and efficient processing of protocol requests.

Conventional prior art email environments utilize data objects that may be composed of named properties, for example, an email message that may include a header set and a body set of named properties so that the two sets may be requested and/or processed separately. Another prior art example is an email message where the body set of named properties includes multiple versions of the email message body, for example, in multiple email message formats such as plain text, hypertext mark-up language (HTML), rich text format (RTF) and so on. In this situation, prior art email server components may respond to a protocol request for the body of the email message in a number of ways. The lowest complexity response may be to send all versions of the email message body but this response may result in increased bandwidth utilization.

FIG. 7A depicts part of a procedure that a previous (prior art) version email server component does use to respond in this situation. In step 701, the email server component examines the format of each email message body. If one of the formats is a predetermined standard format (e.g., RTF), then the procedure moves to step 703 and the standard format email message body is sent to the requesting email client component. If none of the formats is a predetermined standard format, then step 701 branches to step 702 where one of the email message body versions is converted to the standard format. The subprocedure depicted by FIG. 7A may also be used when there is only a single version of an email message body but the email message body may not be in a standard format that is required by a protocol.

FIG. 7B depicts part of a procedure used by a most recent version email server component in accordance with the present invention. In step 704, a protocol request that results in this subprocedure being used by an email server component is examined for a BEST_BODY flag. The flag in this example and the other flags used herein are used to the email server component that the email client component is a most recent version and desires to implement the function associated with the flag. Other indications may be used. For example, the function may be implemented by default if a most recent email client component is detected.

In any event, if the BEST_BODY flag is not found, then step 704 branches to step 701, and continues as described with reference to FIG. 7A.

If the flag is found, the procedure moves to step 705, where the best email message body is selected for sending to the requesting email client component. If there is only a single email message body associated with the requested email message, then it is the best. If there are several email message bodies available, for example, with different formats, then the email server component chooses the best from among them according to, for example, a predetermined ranking of email message body formats (e.g., RTF, HTML, plain text). The process then proceeds to step 703, where the chosen email message body is sent to the email client component. In this embodiment, the email client component may be capable of displaying multiple email message body formats thus freeing the email server component from the requirement to convert email message bodies to a standard format. In addition, the email client component may convert the best email message body to a different format, if desired.

Because the email server component is relieved of the task of converting email message bodies, the present invention provides improved performance. In addition, a most recent version email server component may respond to protocol requests from a previous version email client component with only a moderate increase in complexity.

ROPs may be used to achieve the replication of an email folder between an email server component and an email client component. A request to synchronize a folder may be made, for example, by a SynchFolder ROP. Where an email client component is capable of displaying non-standard email message body formats, it may set the BEST_BODY flag in the SynchFolder ROP to indicate that the email server component may select the best format from among the available email message bodies, rather than requiring the server to return an email message body in a standard format. An email server component may properly process ROPs both with and without the BEST_BODY flag with only a moderate increase in complexity. ROPs for communicating with previous version and most recent version servers may include, for example, the characteristics set out in the table below:

|  | ROP that may be used by a protocol for communicating with previous version servers | ROP that may be used by a protocol for communicating with most recent version servers |
| --- | --- | --- |
| ROP ID | SynchFolder | SynchFolder |
| New parameters | n/a | BEST_BODY flag: if set the email server component chooses the best email message body to send to the email client component. Conversion of the email message body to a predetermined standard format is unnecessary. |

Figure 8B:
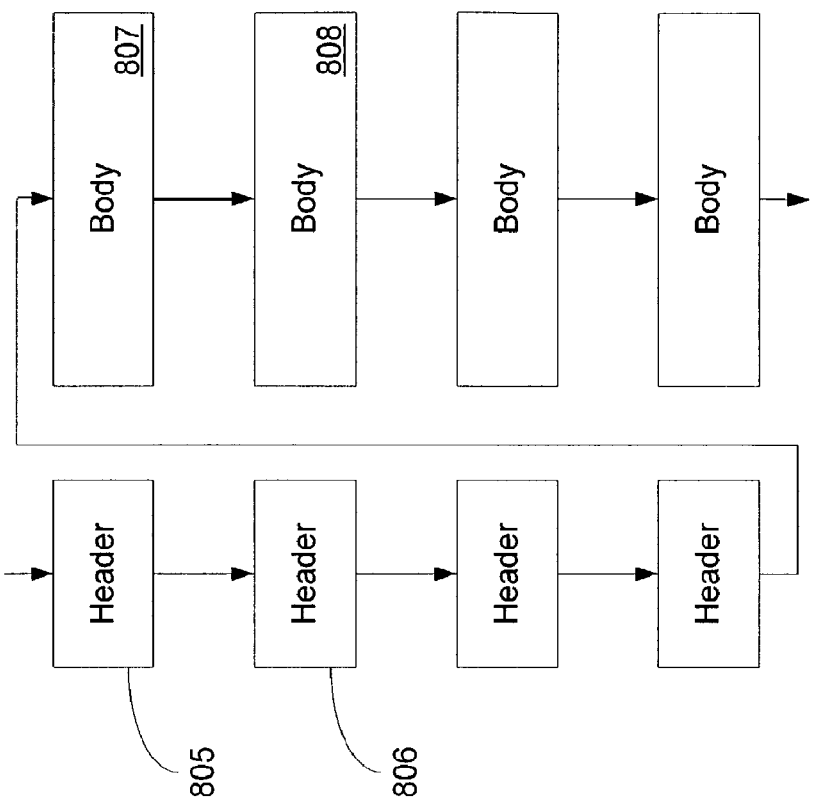
FIG. 8B is a sequence diagram illustrating a headers first transfer mode.
Figure 8A:
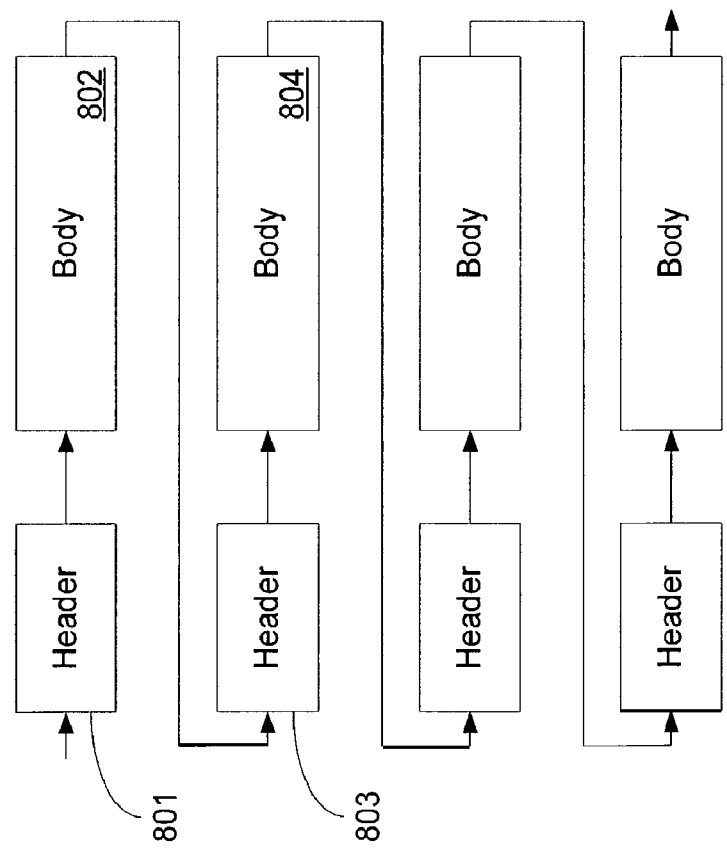
FIG. 8A is a sequence diagram illustrating a full item transfer mode.
Figure 8D:
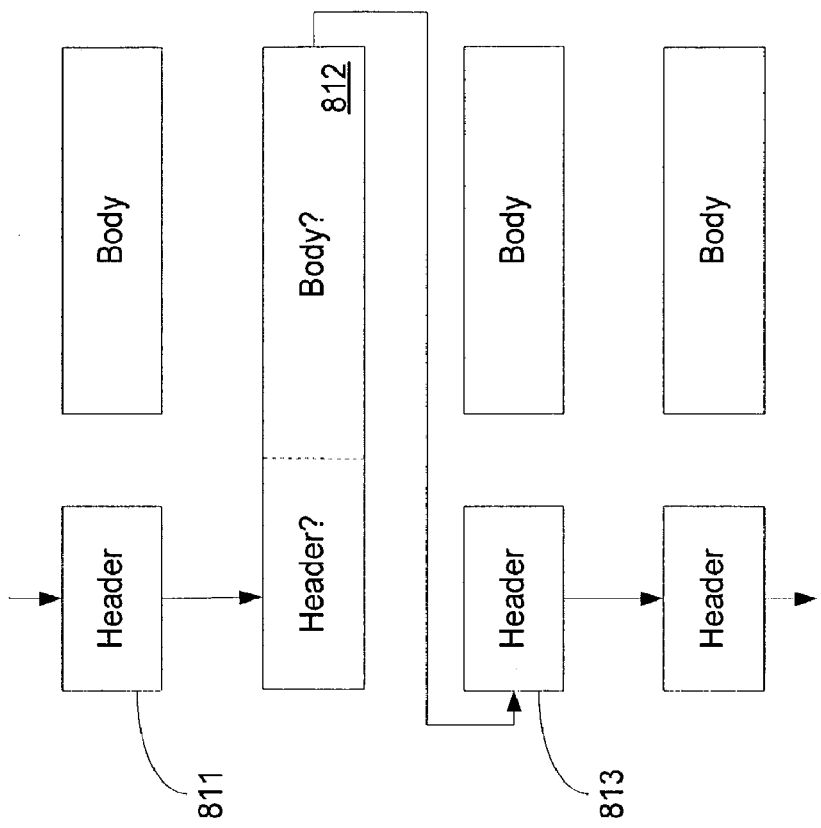
FIG. 8D is a sequence diagram illustrating an exception to a headers first or a headers only transfer mode.
Figure 8C:
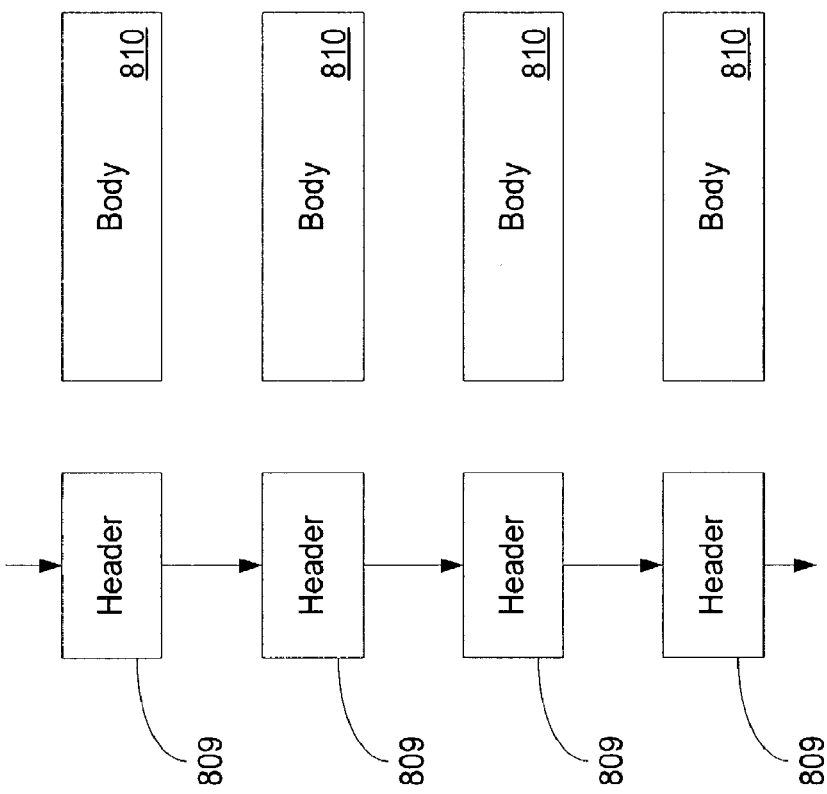
FIG. 8C is a sequence diagram illustrating a headers only transfer mode.

FIGS. 8A-8C show several different existing modes of transferring a set of email messages between an email server component and an email client component. For each mode, each email message has named properties including a header set and a body set, and several email messages are contained in a folder. FIG. 8A illustrates a full item transfer mode. The illustration shows a first email message header 801 being transferred and then a first email message body 802 before a second email message header 803 and then a second email message body 804 and so on until the set of email messages has been transferred. FIG. 8B illustrates a headers first transfer mode. In this mode, a first email message header 805 is transferred and then a second email message header 806 and so on until all the email message headers have been transferred and only then is a first email message body 807 transferred and then a second email message body 808 and so on until the set of email messages has been transferred. FIG. 8C illustrates a headers only transfer mode. As the name suggests, only the email message headers 809 are transferred in response to a request to transfer a set of email messages. Email message bodies 810 will only be transferred in response to an additional explicit request. In any of these modes, the transfer sequence may be temporarily interrupted by a higher priority email client component request, for example, for a particular email message body.

An email folder is an example of a target for a request to transfer a set of email messages. However, an email folder may contain data objects other than email messages. As discussed above, transfer modes are often defined with reference to email message headers and email message bodies, such as the headers first and headers only transfer modes. In such transfer modes, an attempt to transfer data objects for which a header set of named properties and/or a body set of named properties may not be well defined may result in protocol failure. One aspect of the invention avoids this situation by providing that data objects for which a header and/or body set of named properties is not well defined, may always be transferred in whole rather than in part. This embodiment may be illustrated by example with FIG. 8D. In this example, transferal between an email server component and an email client component may be occurring in a headers only mode. Accordingly, a first email message header 811 is transferred and then data object 812 becomes a next candidate for transferal. The header set of named properties is not well defined for a data object 812, such as FAI, so the entire data object is transferred. A next candidate for transferal does have a well defined header set of named properties (i.e., the candidate data object does possess all the named properties explicitly defined by the email client component as belonging to the header set of named properties) and so only an email message header 813 is transferred.

An example of one way to implement this aspect of the present invention is by using a flag, such as IGNORE_MODE_ON_FAI, that may be included in a synchronization ROP, such as SynchFolder ROP described above. An email server component may properly process ROPs both with and without a IGNORE_MODE_ON_FAI flag with only a moderate increase in complexity. ROPs may include the characteristics set out in the table below to achieve the replication of an email folder between an email server component and an email client component:

|  | ROP that may be used by a protocol for communicating with previous version servers | ROP that may be used by a protocol for communicating with most recent version servers |
| --- | --- | --- |
| ROP ID | SynchFolder | SynchFolder |
| New parameters | n/a | IGNORE_MODE_ON_FAI flag: if set, then for data objects, such as FAI, that do not have a well defined set of header and/or body named properties, the email server component may respond to a transfer request with the entire data object regardless of the prevailing transfer mode. |

Email messages are typically addressed to one or more email network users. An email message may be considered delivered if it is accepted by an email server component for storage. An email network may have several email server components. Typically, an email network protocol has some strategy for limiting the number of email server components that an email network user must check for new messages. A common example is the home server strategy which provides that email messages addressed to a particular email network user will only be accepted by one particular email server component, called the user's home server. In such a case, an email client component may be configured to consider only the home server when, for example, periodically checking for new email messages or registering for notification of new email messages.

Figure 9:
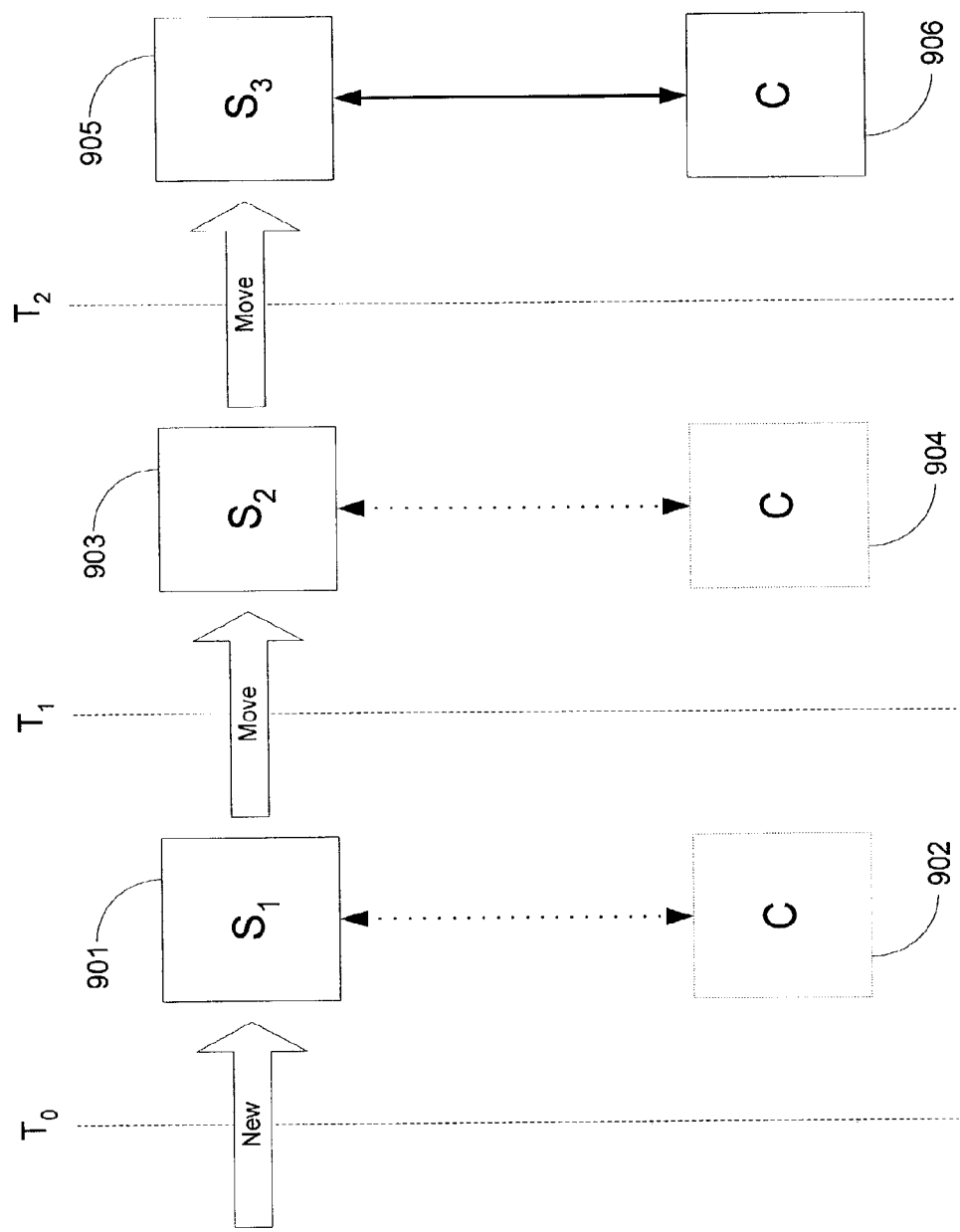
FIG. 9 is a schematic diagram showing an email client component's home email server component being changed over time.

FIG. 9 shows that even a simple home server strategy example may have complications. In the example illustrated by FIG. 9, a particular email server component 901 is first designated as the home server for a particular email network user. Over time, the designated home server for the user is changed to different email server components 903 and 905, typically for administrative reasons. The email server components 901, 903 and 905 may, for example, be physically different, or logically different, or be different versions. Email client component 902 may communicate only with email server component 901 from time $T_0$ until time $T_1$, then email client component 904 may communicate only with email server component 903 until time $T_2$, and then email client component 906 may communicate only with email server component 905. The email client components 902, 904 and 906 may be the same or different. Email server components 901 and 903 may or may not exist after time $T_2$. These complications are particularly relevant to email message store replication which is discussed next.

Email messages may be stored by an email server component in an explicit email message store which may, for example, be implemented using well known database technologies. An email server component may have one or more such message stores. An email network user may have a home message store. Changing home message stores may have the same effects as described for changing home servers.

Some email network protocols include an ability to replicate parts of an email message store to a storage facility local to an email client component. Replication of parts of a remote email message store to a local email storage facility may improve protocol performance and/or perceived protocol performance by, for example, replicating all new email messages to the local email storage facility in advance of an explicit email network user request to view them. Such replication may also provide additional email client component functionality, for example, enabling an email network user to view an email message during network connectivity interruptions.

In an email network environment, simple replication may quickly become inefficient. For example, if an email server component has one email message associated with a particular email network user and that message has already been replicated at the client component for the network user, and a new email message arrives for that email network user, then it is still required that two email messages must be sent in response to a simple replication request. If another new email message arrives after replication of the two email messages, then it is still required that three email messages must now be sent in response to a simple replication request and so on. Some email network protocols have provided for an incremental replication of email message stores to alleviate this problem. In an incremental replication, only changes to an email message store that occurred after a previous successful incremental replication must be sent in response to a replication request, for example, where the only change since the last successful incremental replication is the arrival of a new email message, then only the new email message need be sent in response to an incremental replication request.

Figure 10:
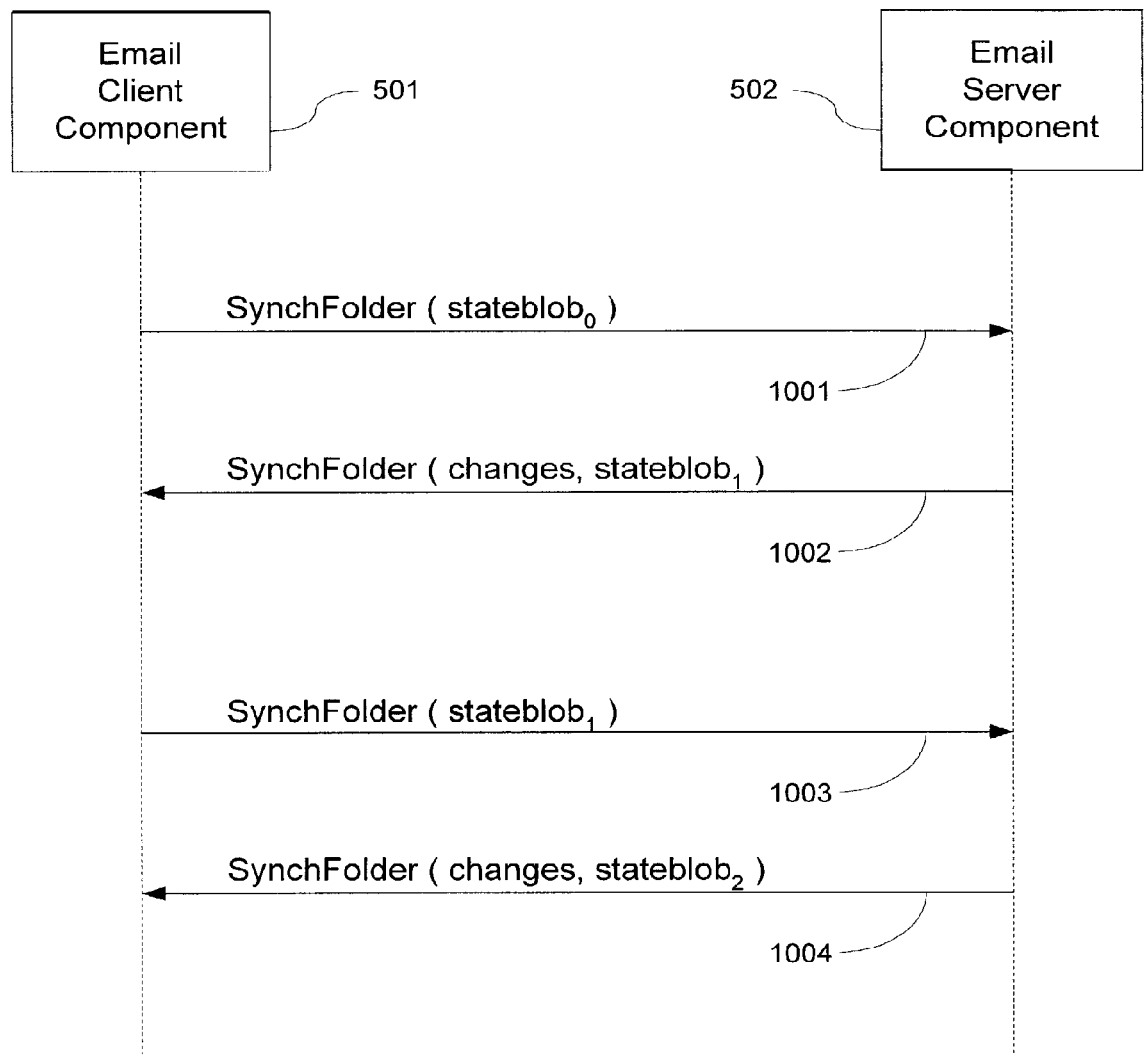
FIG. 10 is a protocol diagram showing an example protocol for synchronizing email folders between an email client component and an email server component.

FIG. 10 shows a more detailed example of a protocol that provides for incremental replication. An email message store may be subdivided into email folders. Each email folder may be replicated independently of the others, providing for a more fine-grained control over the replication process. In this example, the incremental replication process is termed synchronization because it includes the propagation of changes from email client component 501 to email server component 502 as well as from email server component 502 to email client component 501. Following a synchronization request 1001, a SynchFolder ROP is processed by email server component 502. The ROP includes a folderID parameter (not shown) and a stateblob$_0$ parameter. The folderID parameter identifies an email folder that is the target of the synchronization request 1001. The stateblob$_0$ parameter contains information that allows email server component 502 to determine what changes, if any, have occurred to the email folder since it was last synchronized. If request 1001 represents the first ever synchronization request for the target folder by email client component 501, then email server component 502 determines if the target email folder in the email message store has changed in comparison to an empty folder. In response 1002 to request 1001, email server component 502 sends any changes to email client component 501 including any email messages and/or other data objects that have been added to the target folder and a list of any email messages and/or other data objects that have been deleted from the target folder. The email server component 502 also creates a new stateblob$_1$ representing the state of the target folder as it will be on email client component 501 immediately following the synchronization and also sends that stateblob$_1$ in response 1002. When email client component 501 sends the next synchronization request 1003 for the same folder as in request 1001, then request 1003 will include as a parameter the same stateblob$_1$ that was returned with response 1002. As before, email server component 502 will use the information contained in stateblob$_1$ to determine what changes, if any, have occurred in the target folder and send those changes along with a newly created stateblob$_2$ back to email client component 501 in response 1004.

If a stateblob data object is large in size, it may adversely effect protocol performance because it is sent to and from an email server component with, for example, every email folder synchronization request. In some email network protocols that provide for email folder synchronization, the stateblob may, in large part, be made up of a set of message changeID data objects that identify changes to email messages that have been seen by an email client component. An email message change may be said to have been seen by an email client and/or server component when the changed email message is transferred to that component.

One goal of a message changeID data object may be to uniquely identify a change to an email message in the context of an entire email network. In an email network that employs a home server strategy, a user's home server may be responsible for associating a message changeID data object with a previously unseen email message change. For example, a home server may employ message changeID data objects comprising a serverID data object and a serial number. A serverID data object may uniquely identify an email server component in the context of an entire email network using well known techniques such as globally unique identifiers. Where such identifiers are themselves large in size, the serverID data object may instead be an index into an identifier lookup table maintained by the email server component. The serial number may be provided by a counter, for example, six bytes in width, local to an email server component, that is incremented whenever the email server component accepts a previously unseen email message for storage.

For discussion purposes, a message changeID data object may be represented by, for example, "$S_1$:1" where '$S_1$' represents the serverID data object for a first email server component and '1' represents a serial number. A set of message changeID data objects may be represented by, for example, "$S_1$:1, $S_1$:2, $S_1$:3" where "$S_1$:1", "$S_1$:2" and "$S_1$:3" are consecutive message changeID data objects employed by an email server component with serverID $S_1$.

Where a stateblob is made up, in large part, of a set of message changeID data objects representing email message changes seen by an email client component (a "Message Changes Seen" set), some techniques have been developed to encode the set in order to reduce its size, for example, the set "$S_1$:1, $S_1$:2, $S_1$:3, $S_1$:4" may be encoded as "$S_1$:1-4". In addition, an email server component may ensure that the serial numbers it uses are always increasing. In that case a non-contiguous Message Changes Seen set, for example, "$S_1:1$, $S_1:3$, $S_1:5$, $S_1:7$", may be encoded as "$S_1:1-7$", that is, as a range including the minimum and maximum serial numbers, without loss of functionality.

In a scenario depicted by FIG. 9, a Message Changes Seen set may include message changeID data objects that were created by email server components (e.g., $S_1$, $S_2$) other than the current home server (e.g., $S_3$). A message changeID data object created by the current home server may be termed a native message changeID, a message changeID data object created by other email server components may be termed a foreign message changeID. Email network protocols for communicating with previous version email server components have not provided for the optimization of non-contiguous foreign message changeID sequences as a range including the minimum and maximum serial numbers on a per email server component basis. The following table illustrates a benefit of including such optimization in an embodiment of the present invention:

|  | Optimization used by a previous version server (current home server $S_3$) | Optimization used by a most recent version server (current home server $S_3$) |
| --- | --- | --- |
| Message Changes Seen set before optimization | $S_1: 1, S_1: 3, S_1: 5, S_1: 7$<br>$S_2: 1, S_2: 3, S_2: 5, S_2: 7$<br>$S_3: 1, S_3: 3, S_3: 5, S_3: 7$ |  |
| Message Changes Seen set after optimization | $S_1: 1, S_1: 3, S_1: 5, S_1: 7$<br>$S_2: 1, S_2: 3, S_2: 5, S_2: 7$<br>$S_3: 1-7$ | $S_1: 1-7$<br>$S_2: 1-7$<br>$S_3: 1-7$ |

One embodiment of the present invention uses ROPs that include the characteristics set out in the table below to achieve the synchronization of an email folder between an email server component and an email client component. An email server component may implement the improved stateblob encoding technique with only a moderate increase in complexity.

|  | ROP result that may be used by a protocol when communicating with previous version servers | ROP result that may be used by a protocol when communicating with most recent version servers |
| --- | --- | --- |
| ROP ID Unchanged parameters used in a new mode | SynchFolder stateblob: optimization not including non-contiguous sets of foreign message changeID data objects. | SynchFolder stateblob: improved optimization including non-contiguous sets of foreign message changeID data objects. |

Figure 11A:
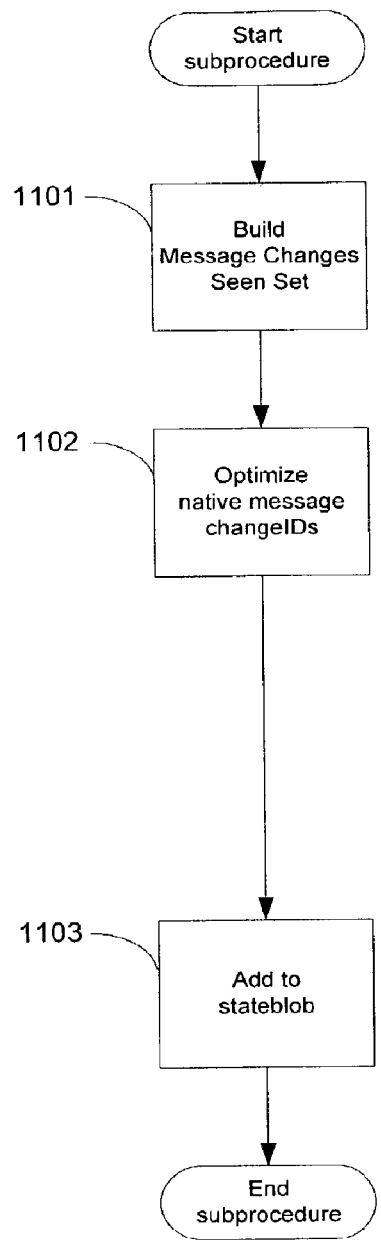
FIG. 11A is a flowchart depicting an example procedure for optimizing part of a stateblob.
Figure 11B:
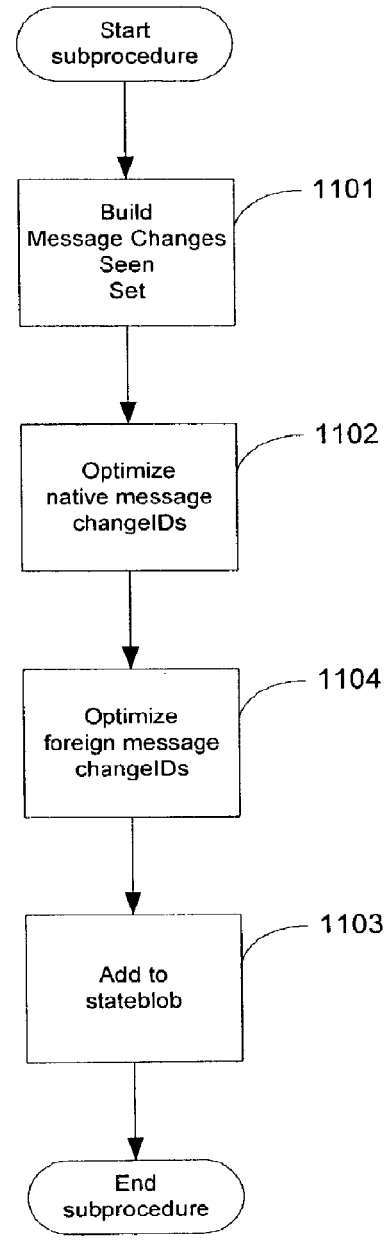
FIG. 11B is a flowchart depicting a procedure for optimizing part of a stateblob in accordance with the present invention.

FIG. 11A and FIG. 11B depict a difference between a subprocedure that may be used by a previous version server and a most recent version server, respectively, to respond to a SynchFolder ROP. FIG. 11A shows steps 1101, 1102 and 1103. At step 1101, an initial Message Changes Seen set is constructed. At step 1102, members of the Message Changes Seen set that are native message changeID data objects are optimized. At step 1103, the optimized Message Changes Seen set is added to the stateblob data object that may be sent with a response to an email client component that requested the synchronization. FIG. 11B includes additional step 1104 which shows members of the Message Changes Seen set that are foreign message changeID data objects also being optimized before the Message Changes Seen set, now with improved optimization, is added to a stateblob data object in step 1103.

While subdividing an email message store into email folders does provide for a more fine-grained control over the synchronization process, it does not automatically provide for an improvement in protocol performance and it may result in a degradation in protocol performance. For example, some protocols require that each message store folder be synchronized separately. Each synchronization operation typically has some overhead and that overhead may be significant. Synchronizations operations that utilize stateblob data objects are an example of operations that may have significant overhead. In the case of synchronizing an entire message store, protocols that require each message store folder to be synchronized separately may be at a disadvantage compared to protocols that require fewer synchronization operations.

Figure 12:
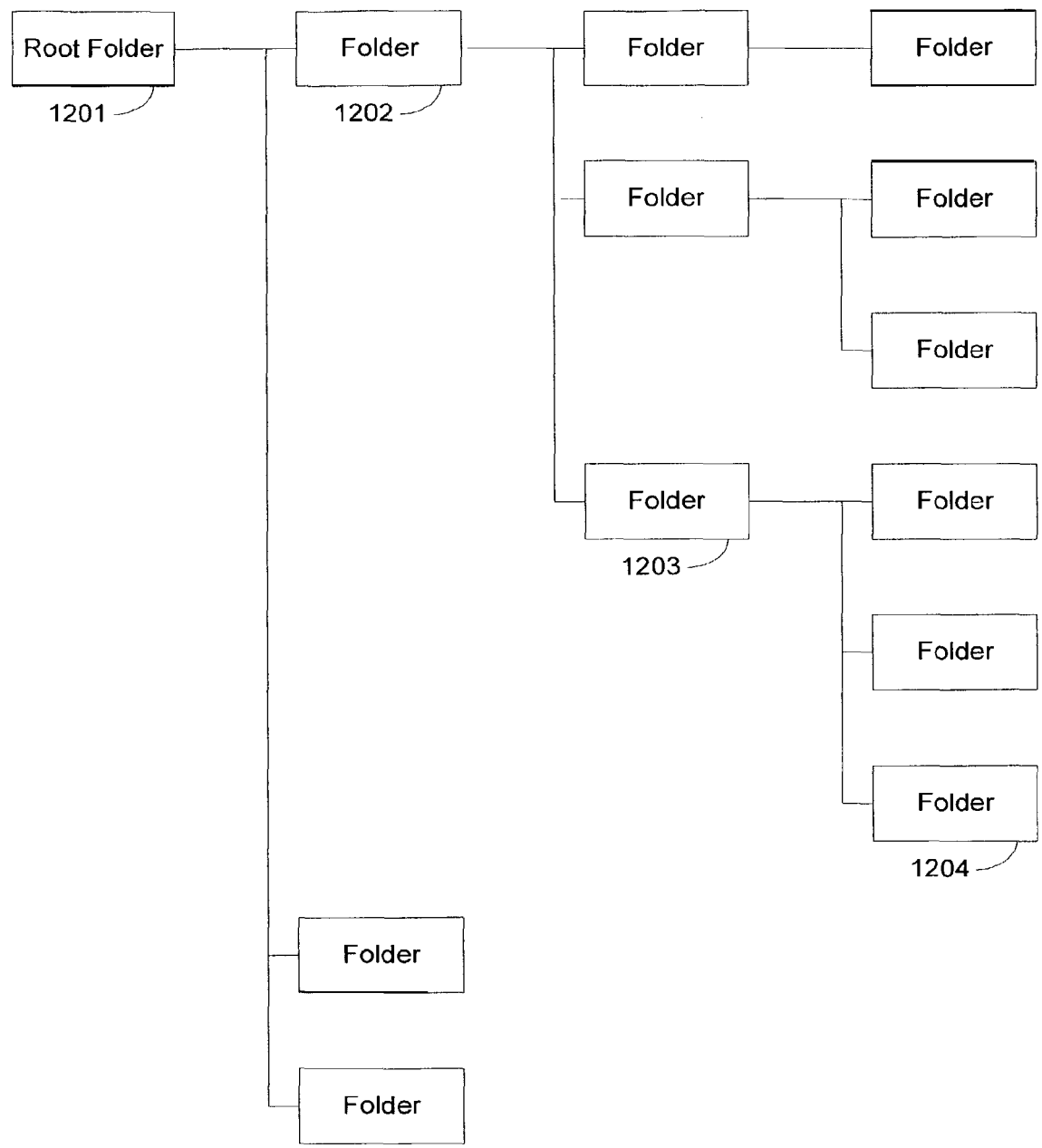
FIG. 12 is a schematic diagram illustrating an email folder hierarchy.

Synchronizing an entire message store and maintaining synchronization is a desirable goal for an email client component. Conventional prior art email client components have sought to achieve this goal even when it resulted in significant adverse impact on protocol performance. An aspect of the present invention is that it is able to minimize adverse protocol impact while achieving this goal by utilizing a deep hierarchy table. Conventional prior art email server components have not been able to provide a deep hierarchy table.

Where email message stores are subdivided into email folders, those email folders may be organized into hierarchies. FIG. 12 shows an example of an email folder hierarchy. In FIG. 12, folder 1204 is a subfolder of folder 1203. Folder 1203 is, in turn, a subfolder of folder 1202. Folder 1201 is a root folder. A root folder is not a subfolder of any other folder. All other folders are members of the folder hierarchy rooted at folder 1201. Typically, each folder in a folder hierarchy does not have direct reference to every other folder. A folder may only have direct reference to its subfolders. A folder may also have direct reference to any folders of which it is a subfolder. In many cases, it may be that the only folder for which every folder has a direct reference is the root folder of the hierarchy.

A deep hierarchy table may contain information about every folder in a folder hierarchy. Each folder may have a row in the deep hierarchy table. The information in the deep hierarchy table is such that it may be used to determine if the contents of an email folder has changed during a particular time period. The determination of change to an email folder during a particular time period may be implemented using a simple comparison of a copy of a folder's row taken at the beginning of the time period, to a copy of that folder's row taken at the end of the time period. In one embodiment, each row of the deep hierarchy table includes the following attributes:

| Attribute Name | Attribute Type | Notes |
| --- | --- | --- |
| Folder ID | FID | The FID type comprises a global unique identifier (GUID) and a six byte serial number. This value may be used to uniquely identify an email folder in the context of an email network. |
| PR_LOCAL_COMMIT_TIME_MAX | Timestamp | This timestamp is updated anytime the contents of the folder is modified. |
| PR_DELETED_COUNT_TOTAL | QWORD | This value is a count of the total number of items ever deleted from the folder. |

Attributes of an email folder's row in a deep hierarchy table may be updated whenever a change is made to the contents of a folder. For efficient implementation of a deep hierarchy table update, applicants have found that it is helpful to have quick and direct reference to the deep hierarchy table. At a minimum, applicants have found that there should be a small and predictable number of levels of indirection when trying to access the deep hierarchy table. For example, positioning a deep hierarchy table at an arbitrary level in a folder hierarchy would not provide for a predictable number of levels of indirection. In one embodiment of the present invention, a deep hierarchy table may be associated with the root folder of an email network user's email message store folder hierarchy for this reason.

Communications between an email client component and an email server component may be divided into communication sessions. Loss of email message store synchronization may occur between sessions, for example, during a network connectivity interruption. In order to re-establish email message store synchronization at the beginning of a communications session, some protocols for communicating with previous version email server components employed a SynchFolder ROP for each folder in the folder hierarchy. Typically, the contents of some of the folders will not have changed between sessions. A SynchFolder ROP with an unchanged folder as its target results in a "null synch." Although a "null synch" does not result in any folder changes being transferred to an email client component, it does still have an overhead associated with it, for example, a stateblob data object, which may be significant.

Figure 13:
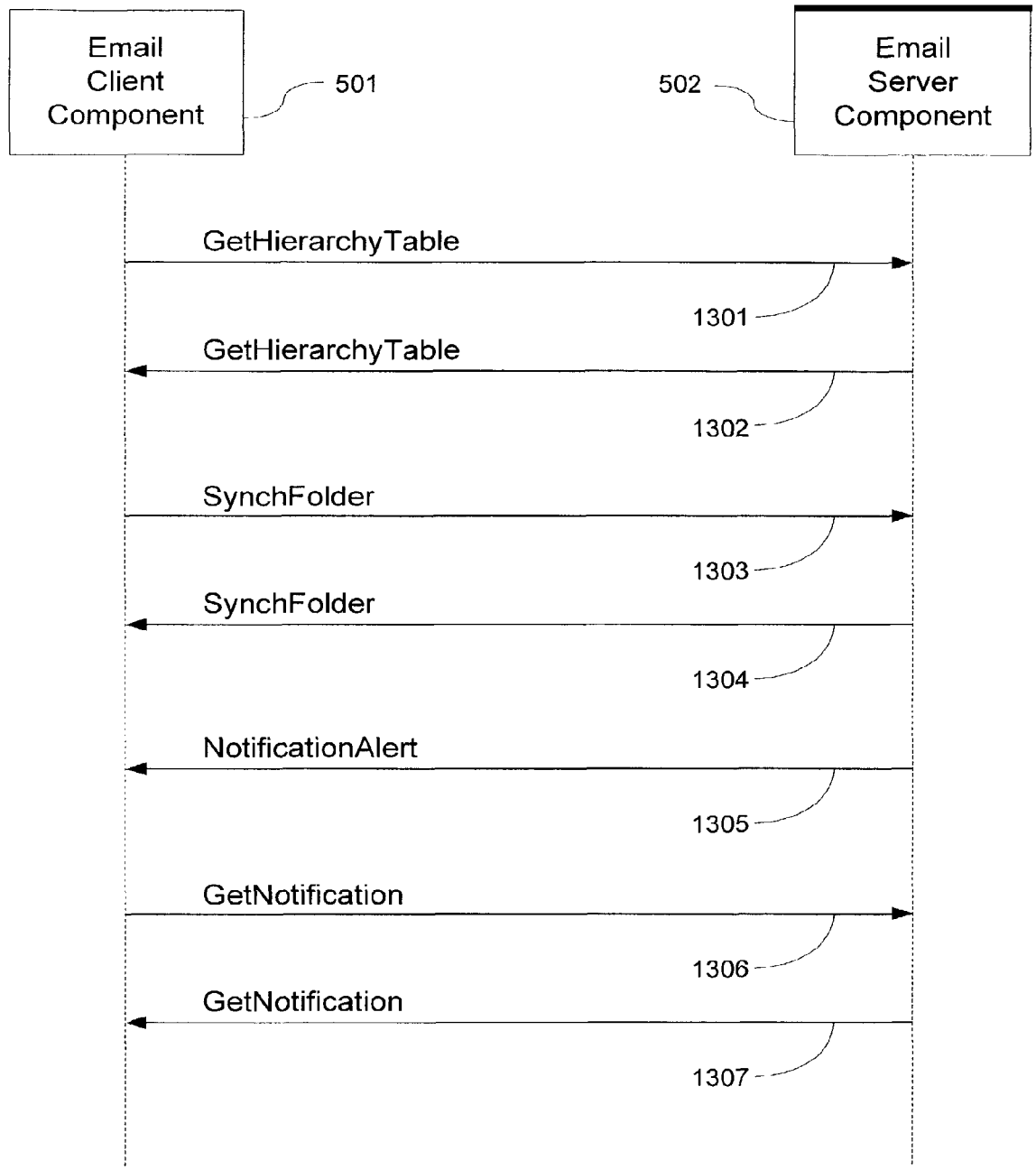
FIG. 13 is a protocol diagram showing an example protocol for synchronizing and maintaining synchronization of an email message store in accordance with an aspect of the present invention.

FIG. 13 illustrates an embodiment of the invention that avoids such "null synch" results by utilizing a deep hierarchy table. In a first request 1301, email client component 501 sends a ROP (e.g., GetHierarchyTable) requesting a deep hierarchy table to email server component 502. In a first response 1302, a copy of the deep hierarchy table is provided to email client component 501. Typically, email client component 501 will have a previous copy of the deep hierarchy table. Email client component 501 may determine quickly which folders in user's email message store on email server component 502 have changed by utilizing a row by row comparison of the two copies. Next, ROPs (e.g., SynchFolder) are employed to synchronize only those folders that have changed. Request 1303 and response 1304 may be repeated as necessary to synchronize the changed folders. Following successful synchronization, the email client component's copy of the deep hierarchy table may be updated to match the latest copy that was sent in response 1302. If email client component 501 does not have a previous copy of the deep hierarchy table, then all folders that have a row in the latest copy may be synchronized.

Once synchronization of a user's email message store has been established, synchronization may be maintained by periodically repeating the start of session steps described above (i.e., polling the email server component), but this scheme has disadvantages. For example, the polling period may be much shorter than a period between changes to a user's email message store. In that case, relatively many of the deep hierarchy table comparisons will indicate that no folders have changed. Such comparisons are, in effect, wasted effort, so a protocol that can avoid them may be more efficient.

Some email networks include a facility for an email client component to subscribe to be notified by an email server component when, for example, the contents of a particular email folder changes. Some previous version email client components do use such a facility to maintain synchronization of a user's email message store by creating a separate subscription for change notifications associated with each folder in a user's folder hierarchy. In an embodiment of the present invention, an email client component may create only a single subscription for change notifications associated with the deep hierarchy table. A single subscription is more efficient because fewer ROPs are required to establish it and less server-side resources are consumed.

With further reference to FIG. 13, when a most recent version email client component 501, in accordance with an aspect of the present invention, employs a GetHierarchyTable ROP in a first request 1301 at the beginning of a communications session with an email server component 502, the email client component 501 is automatically subscribed to change notifications associated with the deep hierarchy table that is returned in response 1302. When a change occurs to an email folder in a user's email message store at the email client component, for example, an email message is added to the folder, the deep hierarchy table is also updated as previously described. The change to the deep hierarchy table triggers a notification alert 1305 to email client component 501. While the notification alert is in response to the subscription placed by request 1301, it is not part of an explicit request-response cycle. Thus, use of the notification system as provided by the present invention results in much less overhead for the email network.

A single subscription may result in many notifications. In one embodiment, the alert is delivered using a connectionless network transport mechanism, for example, User Datagram Protocol/Internet Protocol (UDP/IP), but any suitable network transport mechanism may be used. In response to the alert, email client component 501 sends a request 1306 containing a ROP (e.g., GetNotification) to email server component 502. In response 1307, any changed rows of the deep hierarchy table (i.e., rows corresponding to a changed folder that triggered the notification) are sent to email client component 501. Email client component 501 then employs ROPs (e.g., SynchFolder) to synchronize only the folders that have changed.

Figure 18:
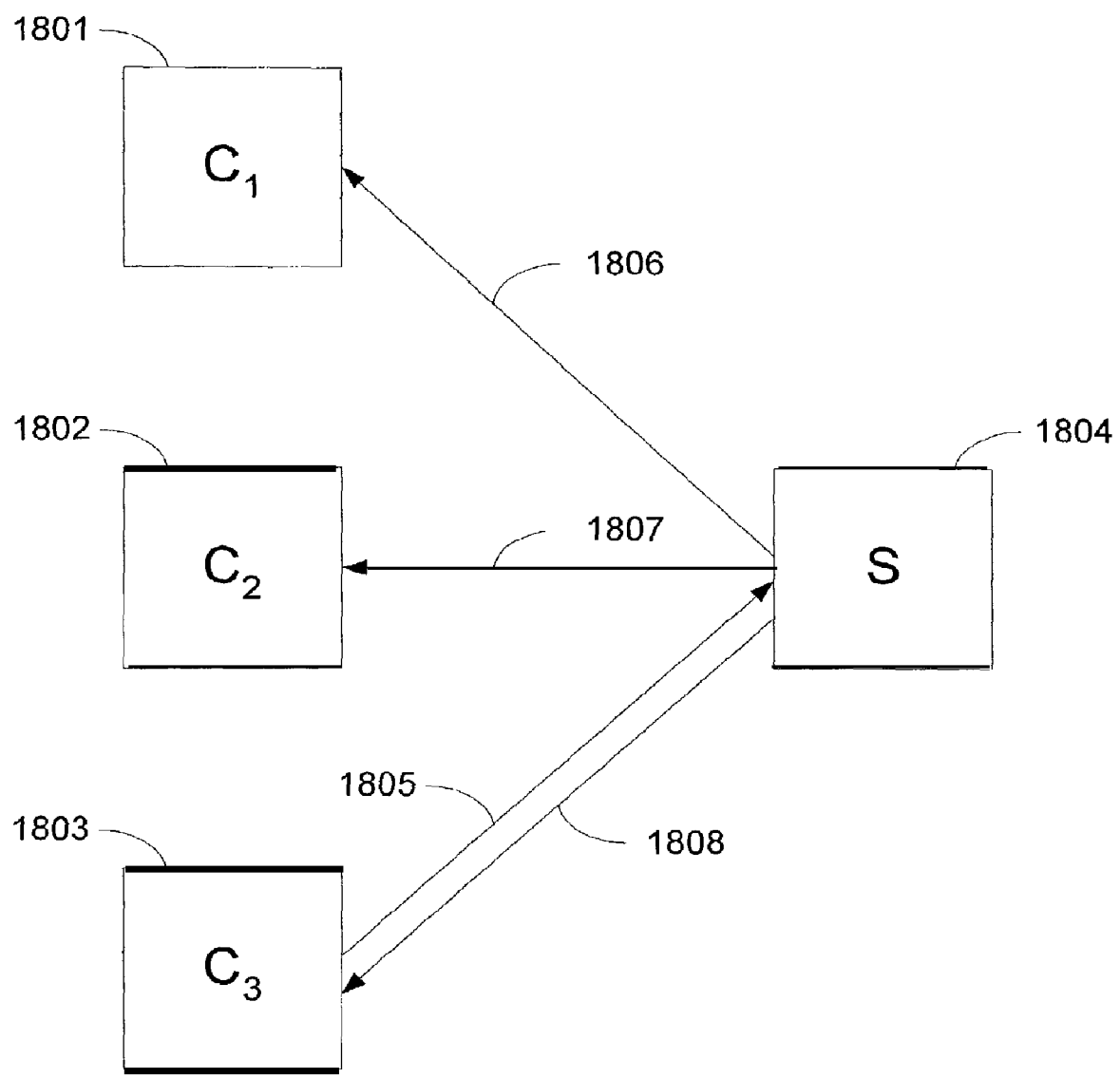
FIG. 18 is a schematic diagram of multiple email client components being notified as the result of a change to the same data object at an email server component.

Multiple email client components may be subscribed for change notifications associated with the same data object (e.g., the same email folder), for example, to provide collaborative functionality. As illustrated by FIG. 18, email client components 1801, 1802 and 1803 are subscribed for change notifications associated with the same data object (not shown) located on email server component 1804. Email client component 1803 sends a ROP 1805 to email server component 1804 that results in a change to the data object. As a result of the change, email server component 1804 sends out change notifications 1806, 1807 and 1808 to email client components 1801, 1802 and 1803. Change notifications may carry little information beyond identifying the data object that has changed so that, for example, there may be no way for an email client component to determine that it was the cause of a particular change. If the data object is, for example, an email folder, change notifications 1806, 1807 and 1808 may result in each email client component 1801, 1802 and 1803 initiating synchronization for the changed folder. Since email client component 1803 was, in this example, responsible for the change, the result will be a "null synch."

For reasons previously discussed it may be desirable to eliminate synchronizations that result in a "null synch." However, the notification behavior described may not always be undesirable and some email client components may depend upon it. An aspect of the present invention is to provide for the ability of an email client component to configure a notification behavior of most recent version email server components in order to improve protocol performance while at the same time providing previous version email client components with unchanged notification behavior.

Figure 19A:
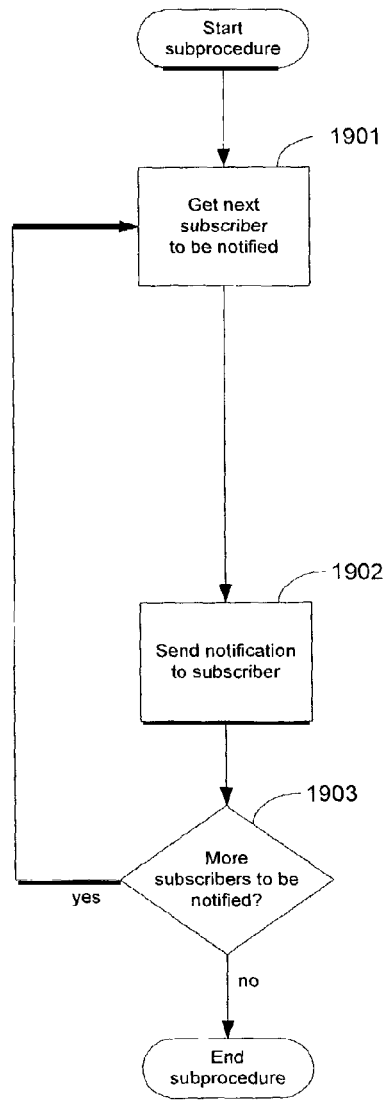
FIG. 19A is a flowchart depicting a procedure for notifying multiple subscribers.
Figure 19B:
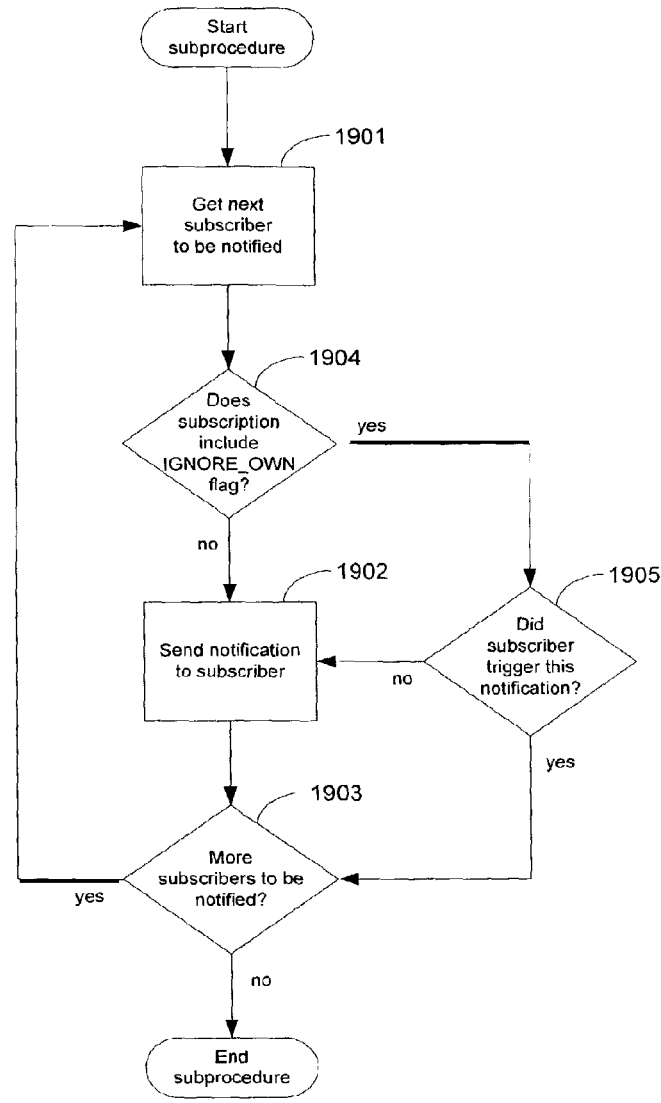
FIG. 19B is a flowchart depicting a procedure for notifying multiple subscribers in accordance with an aspect of the present invention.

FIG. 19A depicts notification behavior that may be provided by previous version email server components. FIG. 19B depicts configurable notification behavior in accordance with an aspect of the present invention. If desired, a most recent email client component may indicate to an email server component that it is capable of the notification behavior in FIG. 19B, for example by supplying a flag with a request, in the example shown in FIG. 19B, an IGNORE_OWN flag.

At step 1901, the next candidate from the set of subscribers to be notified is selected. At step 1904, the subscription is examined for the IGNORE_OWN flag. If the flag is not present, step 1904 branches to step 1902, where a notification is sent to the candidate subscriber. If the flag is found, step 1904 branches to step 1905, where the subscription is examined again to determine if the subscriber triggered this notification. This determination may be made, for example, by examining a communications session identifier ("session ID") of the session that was used to place the subscription. A session ID, for example, may comprise a global unique identifier and a six byte serial number. The notification is also examined for the session ID associated with its cause. If the two match, then the notification is suppressed. A result is that an email client component that caused a notification will not also receive that notification. The subprocedure then proceeds to step 1903, described below.

If the subscriber did not trigger the notification, then the session ID associated with the subscription is not the same as the session ID associated with the cause of the notification, and step 1905 braches to step 1902, where the notification is sent. The process then proceeds to step 1903, where a determination is made whether there are more subscribers to be notified. If there are, the subprocedure returns to step 1901, otherwise this subprocedure is finished.

As stated above, an email client component utilizing cache storage of email messages may request, for example via a ROP, synchronization of messages or other data objects between a local client data store and the data store available at the email server component. The email client component may similarly request messages to be copied from the server store to the client store. In either event, the request may be made using a fast transfer mode.

Figure 14A:
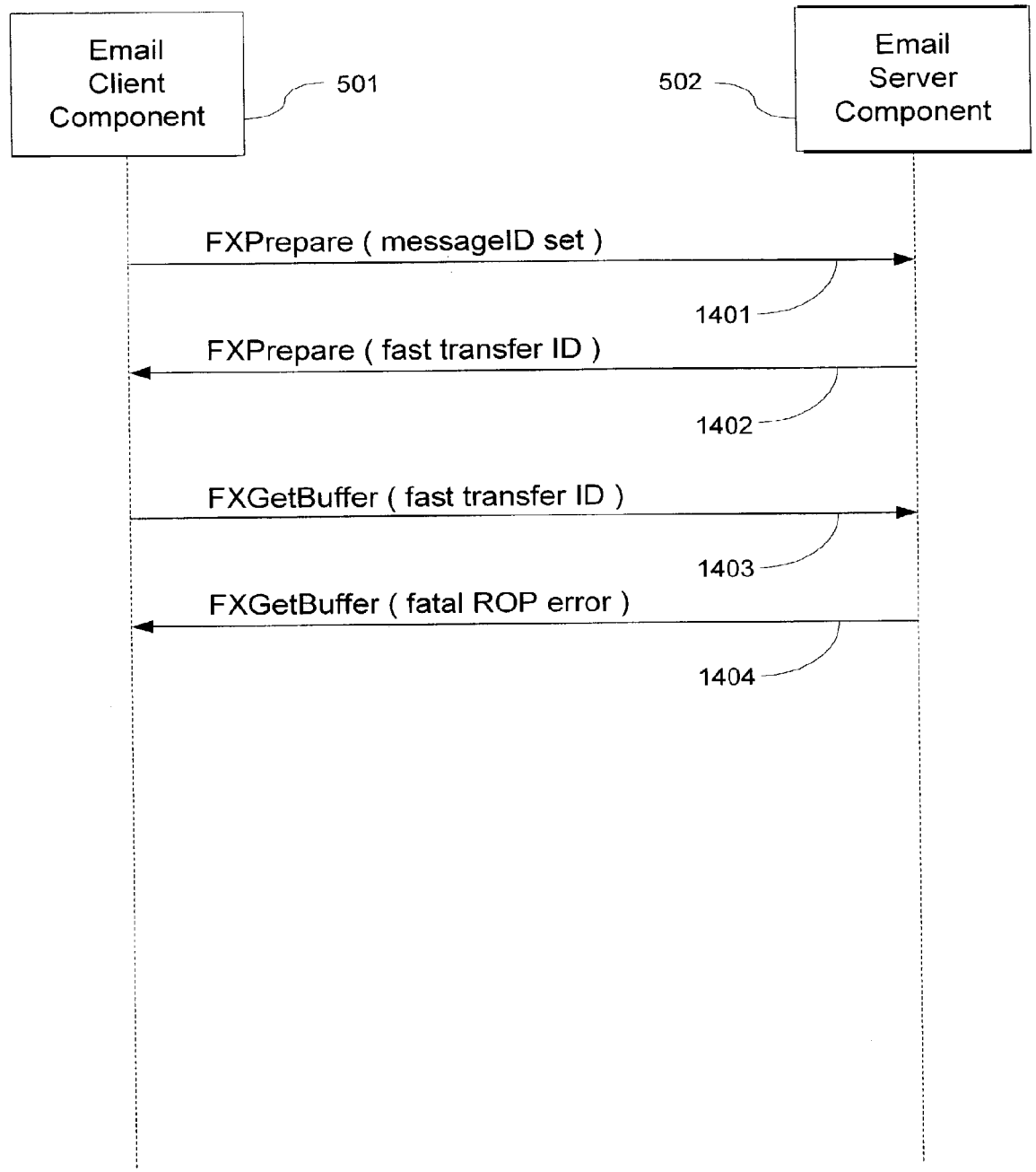
FIG. 14A is a protocol diagram showing an example protocol for communicating error information at the ROP level.

Typically, when messages or other data such as files are requested for synchronization or copying, the request (e.g., ROP) includes an indication of all the messages for which synchronization is desired. This list may be automatically constructed by an email server component by, for example, utilizing the stateblob feature described above. For previous version (prior art) email server components, an error in one message or data object in a ROP request would cause a failure of all items in the request. This process is shown in FIG. 14A, where a request containing a ROP (e.g., FXPrepare) is transmitted at step 1401 with a messageID set designated for copying or synchronization. A fast transfer mechanism is set up at the email server component 502, and a fast transfer ID is transmitted to the email client component 501 at step 1402. The email client component 501 then requests copying or synchronization of the data objects through a request containing, for example, an FXGetBuffer ROP (step 1403). An error occurs with one or more of the messages or other data objects when the email server component 502 attempts to open the requested messages. Examples of errors include a message or a data object being corrupt, server failure, the email server component 502 being out of memory, or a virus being detected for the data object.

After the error, the email server component 502 sends a fatal ROP error in the data streamed to the email client component 501 at step 1404. As such, the synchronization fails, the messages within the messageID set are not synchronized or copied, and the stateblob or similar update information is not received by the email client component 501. The email client component 501 then has to request the synchronization or copying of the data objects at another time. It is possible that, if an error is not fixed at the email server component 502, error messages may continue to be sent, and the messages within the messageID set may never be synchronized or copied.

In accordance with one aspect of the present invention, instead of a fatal ROP error, a most recent email server component may send error information regarding the particular data object (e.g., an email message) so that synchronization for only that data object fails. This feature permits messages or other data objects within a ROP or other request to be transmitted and synchronized or copied even if a message or other data object having an error is included within the response.

As one example of how to handle an object-specific error, a most recent email server component may send an error message in a data stream for the data object having an object error. In this example, for ease of reference, the error is referred to as FXErrorInfo. If desired, as further described below, FXErrorInfo may include information such as the message ID for the data object having the error, and additional information regarding why the message failed.

Figure 14B:
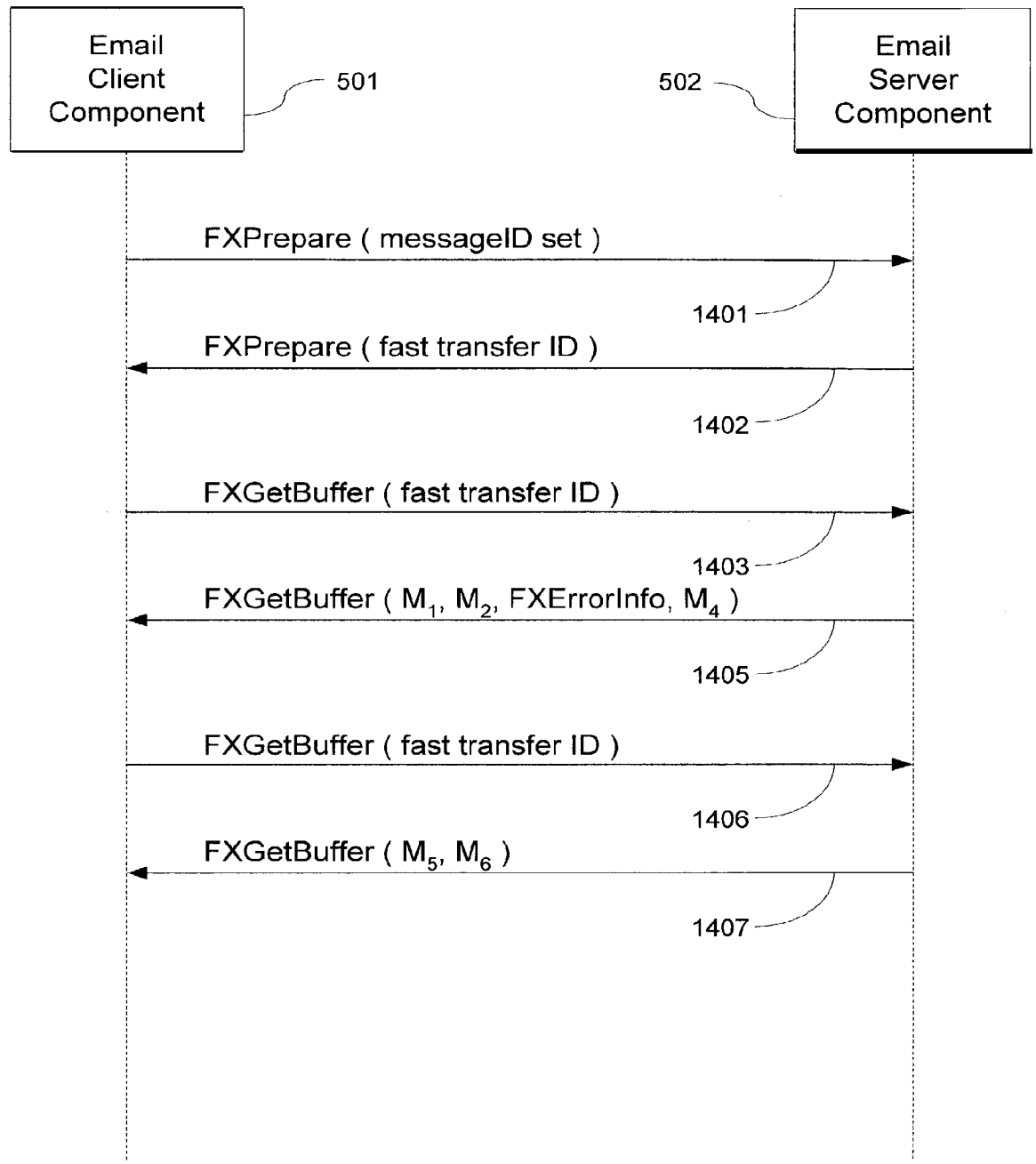
FIG. 14B is a protocol diagram showing an example protocol for communicating error information on a per message basis in accordance with an aspect of the present invention.

FIG. 14B shows a synchronization in which an error occurs in a message $M_3$. The error results in a FXGetBuffer response 1405 including message $M_1$, and message $M_2$, followed by FXErrorInfo, and then message $M_4$. The FXErrorInfo information permits the email client component 501 to know which message had an error, and to synchronize all other messages within the response. If the error message FXErrorInfo includes information about the reason for the error, the information may be acted upon accordingly by the client component, for example, by displaying an error message to a user.

The following table shows an example of the format that the FXErrorInfo may take:

| FXErrorInfo | | |
|---|---|---|
| Attribute Name | Attribute Type | Notes |
| Version | WORD | The version of this structure. |
| Error code | DWORD | |
| Message ID | MID | The MID type comprises a global unique identifier (GUID) and a six byte serial number. This is the message ID of the message that caused the error. |
| ... | ... | Zero or more attributes may be added here. |
| Auxiliary Field Size | ULONG | The size of the array to follow. |
| Auxiliary Field | BYTE array | An unstructured array for communicating error details. |

As can be seen, the example format includes a version attribute, an error code, and a messageID. In addition, if desired, one or attributes may be added. Further, as stated above, an auxiliary field may be defined for communicating error details. As such, an attribute may be defined for dictating the field size of the error details (e.g., an array), and a field may be provided, which may be, for example, an unstructured array for communicating the error details. As stated above, the error details may be handled as desired by the email client component 501.

The FXErrorInfo permits the synchronization of the first response to be complete, for example resulting in a stateblob or other information being provided to email client component 501. Because the email client component is now synchronized through message $M_4$, the next request 1406 for synchronization may result in a response 1407 having the messages after $M_4$ (e.g., $M_5$ and $M_6$).

To indicate that an email client component 501 is a most recent version, and thus is capable of handling the FXErrorInfo message, a flag may be defined, for example, FXRecoverMode, that may be transmitted with a ROP requesting synchronization or copying. Other indications may be used for the email client component 501 to communicate to the email server component 502 that it is capable of handling the FXErrorInfo message.

When the email server component 502 sends one or more messages or other data objects to the email client component 501, the data stream to the email client component may be separated or defined by property tags (e.g., ptags). For example, a list of messages may include for each message a start message ptag and an end message ptag. Between the start and end ptags may be a property list ptag and a subject ptag, which may have the property of a string. The subject ptag may be followed by the subject itself. Other property tags may be included.

In the case where an error occurs in transmitting a message, the FXErrorInfo may be provided as a ptag, and may have binary properties, such as is defined by the table above. An example of a data stream follows having both a successful message and a message in which an error occurs. In the case where the error occurs, the end message ptag is not used for that particular message and the ptag FXErrorInfo is the last ptag for that message.

```
ptagMessageListStart
    ptagMessageStart
        ptagPropList
            ptagSubject [PT_STRING]
                "Re: Your email"
        ...
    ptagMessageEnd
    ptagMessageStart
        ...
        ptagFXErrorInfo [PT_BINARY]
            [Contents as described by table]
    ptagMessageStart
        ...
    ptagMessageEnd
ptagMessageListEnd
```

Figures 15A, 15B:
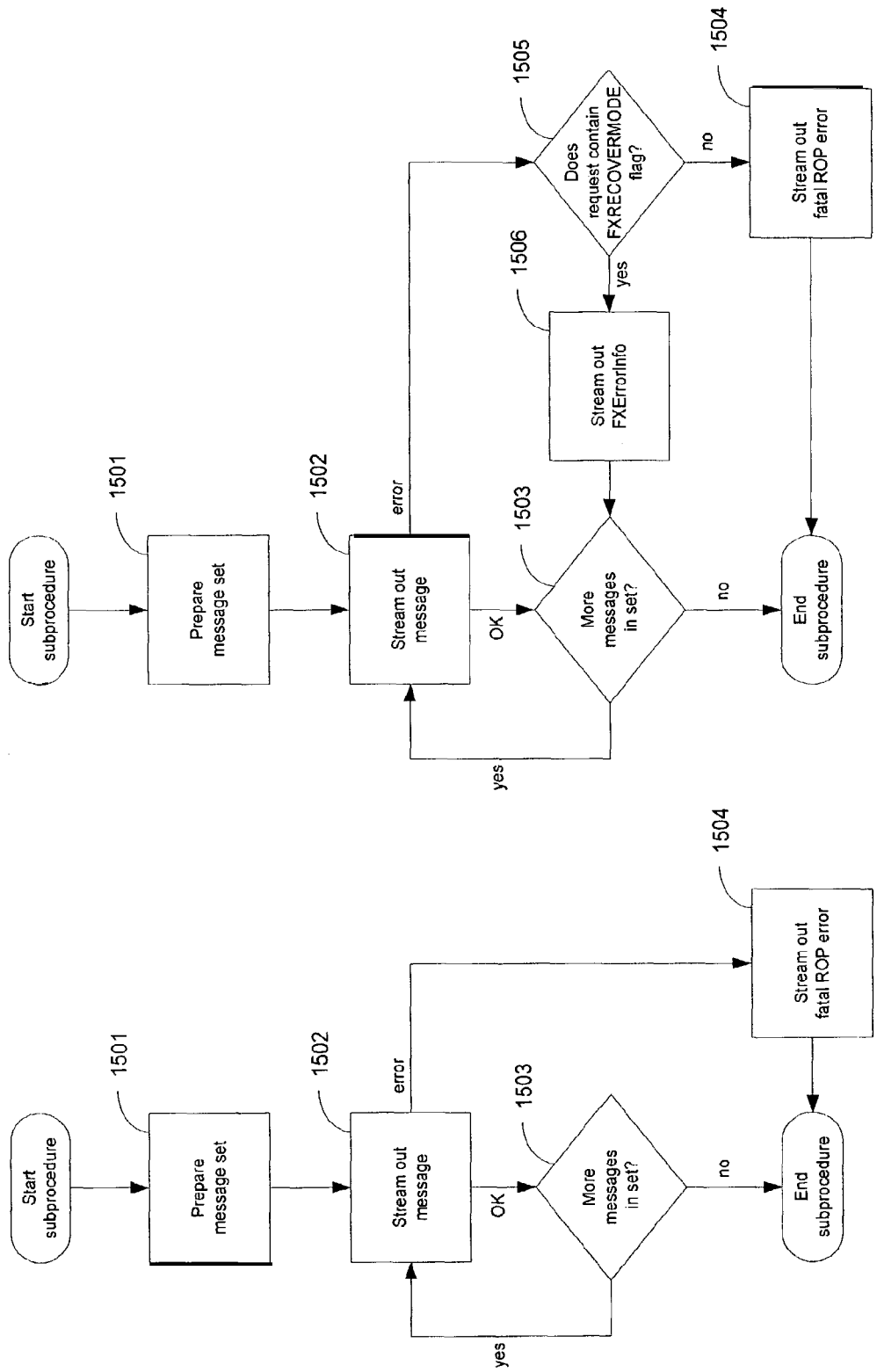
FIG. 15A is a flowchart depicting a procedure for generating error information at the ROP level.
FIG. 15B is a flowchart depicting a procedure for generating error information on a per message basis in accordance with an aspect of the present invention.

FIG. 15A shows steps that an email server component 502 may utilize to transfer messages to a previous version email client component 501. Beginning at step 1501, the message set is prepared, for example by placing the message set in the fast transfer data store. At step 1502, the message begins streaming out, for example immediately after being placed in the send buffer of the email server component 502. If an error occurs when streaming out the message, then a fatal ROP error is streamed out to the email client component 501 in step 1504. The subprocedure then ends. If, when streaming the message, an error does not occur, then at step 1503 a determination is made whether more messages are in the set. If so, the process loops back to step 1502, where the next message is streamed out. If not, then the subprocedure ends.

FIG. 15B shows a procedure for handling a message set by a most recent version of an email server component 502. The steps taken are different depending upon whether the email client component is a most recent version or a previous version. Steps 1501-1504 are steps taken with a previous version email client component, and are the same as the steps having the same reference numerals in the preceding paragraph.

If, at step 1502, an error is found in streaming the message, then a determination is made at step 1505 whether the request includes a flag, such as FXRecoverMode. If the request contains the flag, then the email client component 501 is a most recent version, and step 1505 branches to step 1506, where the FXErrorInfo is streamed out to the email client component 501. The process may then continue to step 1503. If the request does not include the flag, then step 1505 branches to step 1504, where a fatal ROP error is streamed out. The subprocedure then ends.

As can be seen, the presence of the flag in the request permits the streaming process to continue by allowing a streaming out of the FXErrorInfo instead of failing and sending a fatal ROP error. The flag is sent by a most recent version of an email client component 501. Previous versions of email client components do not include the flag, and thus an error results in streaming out a fatal ROP error, as described above.

If desired, in an alternative embodiment, the error message (e.g., FXErrorInfo) may be sent out for particular properties of a message or other data object, instead of for an entire message. For example, FXErrorInfo may be sent out for the body of a message, or for an attachment to a message. The email client component 501 may then synchronize or copy properties that are successfully sent without an error, and only the properties having errors are not synchronized or copied.

Sometimes, a message or other data object may be of sufficient size that it spans multiple FXGetBuffer responses. To handle such messages, the email client component 501 may include rollback logic so that it may dispose of any partially received message and then proceed to properly receive further messages after receiving an error message.

At times, it may be desirable for an email client component to be provided feedback regarding the progress of the copying or synchronization of data objects such as email messages. In accordance with one aspect of the present invention, a most recent version of an email client component 501 may indicate that it is capable of handling progress modes, for example by sending a flag, such as PROGRESS_MODE to an email server component 502 when requesting synchronization or copying of data objects. In response, a most recent version of an email server component 502 may send a variety of information along with messages, such as the total size of all of the messages, the total number of messages, and total size of each messages, or any one or combination of these.

Figure 16A:
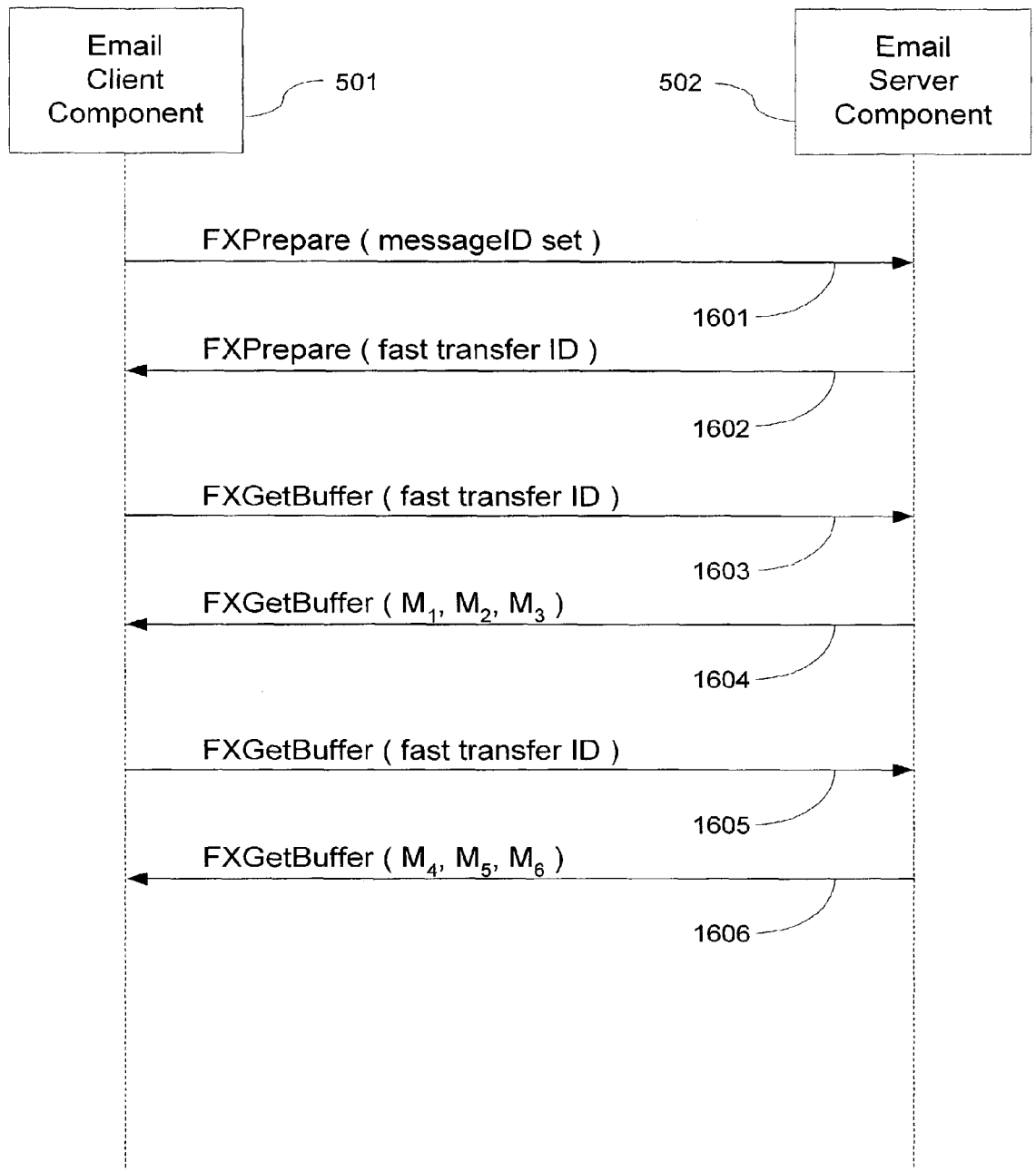
FIG. 16A is a protocol diagram showing an example protocol for carrying out a fast transfer operation.

For example, as shown in FIG. 16A, for a previous version email client component 501, in response to a fast transfer request (1601 and 1603) for a set of messages, the email client component 501 receives the messages. In FIG. 16A, messages are received in two responses 1604 and 1606. In previous version email client components 501 that use a fast transfer mechanism, a progress indication of the messages being streamed to the client was not provided.

Figure 16B:
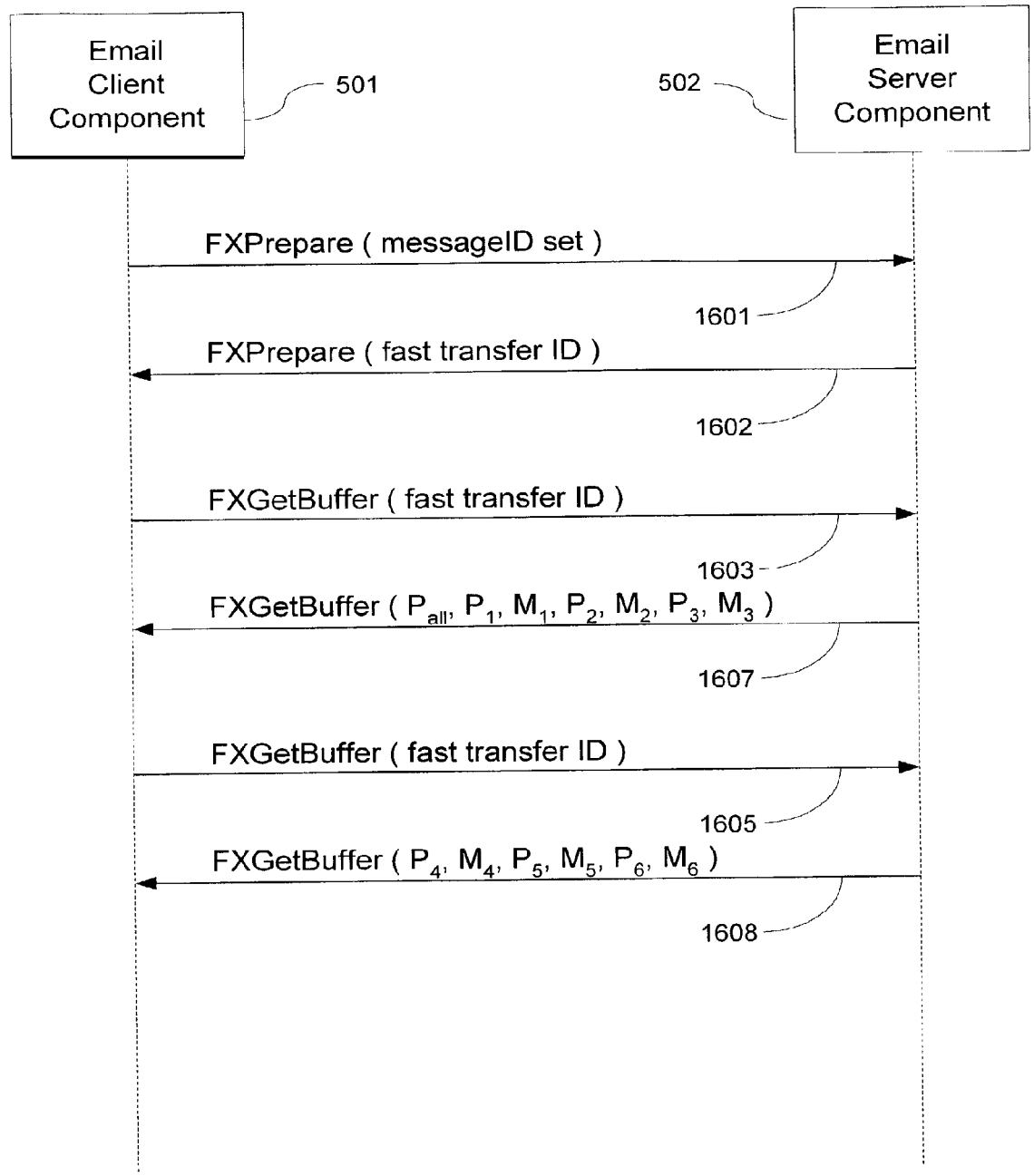
FIG. 16B is a protocol diagram showing an example protocol for providing progress information while carrying out a fast transfer operation in accordance with an aspect of the present invention.

However, as shown in FIG. 16B, is a response 1607 to a request for a message set by the email client component, the email server component 502 may provide a total number of data objects to be transferred, and the total size of all data objects to be transferred. This information is represented by "P$_{all}$" in FIG. 16B. A most recent version of an email server component 502 may also supply the size of each message, indicated by "P$_1$, P$_2$, P$_3$, . . . " in FIG. 16B. In addition, if desired, the information associated with each message and with the entire group of the messages may include additional information regarding whether each message is FAI or an actual email message. In one embodiment, the information represented by "P$_{all}$" in FIG. 16B is always sent in response to a fast transfer request, even if zero data objects are transferred, in order to simplify processing of the data stream.

An example of a format for the size and number of all data objects being transferred is shown in the following table.

| | IncrSyncProgressMode | |
|---|---|---|
| Attribute Name | Attribute Type | Notes |
| Version | WORD (e.g., a 16 bit integer) | The version of this structure. |
| cAssocMsgs | DWORD (e.g., a 32 bit integer) | The number of FAI data objects to be transferred. |
| llTotalAssocMsgSize | QWORD (e.g., a 64 bit integer) | The total size of all FAI data objects to be transferred. |
| cNormalMsgs | DWORD | The number of email messages to be transferred. |
| llTotalNormalMsgSize | QWORD | The total size of all email messages to be transferred. |

As can be seen, separate attributes may be defined for the number of FAI data objects, the total size of all FAI data objects, the number of email messages to be transferred, and the total size of all the email messages to be transferred. Other combinations and additional attributes may be added to the format as desired.

The following table shows a format for the size and other information that may be supplied with each message.

| | IncrSyncProgressModePerMsg | |
|---|---|---|
| Attribute Name | Attribute Type | Notes |
| Message Size | LONG | The size of the next message. |
| FAI flag | BOOL | Indicates if the next message is FAI. |

As can be seen, the format includes the size of the next message and whether or not the next message is FAI.

FIGS. 17A and 17B show steps for streaming a message set in accordance with a previous version of the email components, and a most recent version of the email components, respectively. The steps in FIG. 17A are similar to steps 1501-1503 in FIG. 15A. For FIG. 17B, the PROGRESS_MODE flag has been sent, for example with a ROP, by a most recent email client component 501. After the message set is prepared at step 1701, a determination is made whether the flag is present. If so, then the progress data totals are sent in step 1702, and the process then proceeds to step 1502, where the first message is streamed. If the flag is not present, then step 1701 branches directly to step 1502.

After the first message is streamed, the process proceeds to step 1703, where a determination is made if the flag is available. If so, then step 1703 branches to step 1704, where the per message progress data is streamed. The process then proceeds to step 1503, described earlier. If the flag is not available, step 1703 branches directly to step 1503.

An example of the stream of data for a most recent server component sending data to a most recent client component is set forth below. The stream of data is similar to the stream of data described above, but additionally includes ptags for progress totals data (ptagIncrSyncProgressMode), which may have, for example, binary properties. In addition, for each message, the per message progress data is supplied, for example, as ptagIncrSyncProgressModePerMsg.

```
PtagIncrSyncProgressMode [PT_BINARY]
    [Contents as described by table]
ptagMessageListStart
    PtagIncrSyncProgressModePerMsg [PT_BINARY]
        [Contents as described by table]
    ptagMessageStart
        ptagPropList
            ptagSubject [PT_STRING]
                "Re: Your email"
        ...
    ptagMessageEnd
    PtagIncrSyncProgressModePerMsg [PT_BINARY]
        [Contents as described by table]
    ptagMessageStart
        ...
    ptagMessageEnd
    PtagIncrSyncProgressModePerMsg [PT_BINARY]
        [Contents as described by table]
    ptagMessageStart
        ...
    ptagMessageEnd
ptagMessageListEnd
```

In the example shown, the ptags including the progress totals data (ptagIncrSyncProgressMode) and the ptags for the message progress data (ptagIncrSyncProgressModePerMsg) are located before the list of messages, and before each message, respectively. However, the structure of the streaming of the data objects may be revised so that the progress data may be included within the messages or within the message list. It is further possible to revise the structure of the streaming of the data objects in order to eliminate ptags delimiting messages and/or message lists entirely.

An email client component receiving the progress data may utilize this data to determine the progress of synchronization or copying of data objects from the email server component, and may utilize the per message progress data to determine the progress of each individual message. This information may be helpful, for example, in monitoring real time information about the progress of a synchronization.

There are several different character sets that may be used for storing an email message or other data objects. For example, ASCII is most commonly used for storing English language characters. However, ASCII is not sufficient for storing characters for all languages, because it is based upon 8-bit characters. Thus, ASCII code can be used for only 256 characters, which is enough for English but not enough for languages that have more characters. Unicode, on the other hand, is a character set that uses 16 bits (two bytes) for each character, and therefore is able to include more characters than ASCII. Unicode can have 65,536 characters, and therefore can be used to encode almost all the languages of the world. Unicode includes the ASCII character set within it.

In general, previous versions of email client components 501 have a designated code page, or character set and/or language associated therewith. For example, a particular version of an email client component 501 may have a German code page, and another version may have an ANSI code page. At times, it may be desirable for an email client component 501 to receive emails in character sets other than the designated code page. In accordance with one aspect of the present invention, a most recent client component may force an email server component to provide all emails in Unicode. Once the emails are received by the email client component 501, the Unicode emails may be converted to the client's code page, or may alternatively be maintained in Unicode format.

To indicate that an email client component 501 calls for emails to be provided in Unicode, the email client component 501 may, for example, provide a flag, such as FORCEUNICODE, to the email server component 502. The flag may be provided with a request, such as a ROP. If the email server component 502 is a most recent version, the email server component 502 can provide a Unicode version of the email, if available, or can convert email messages in other character sets to Unicode.

Figure 20:
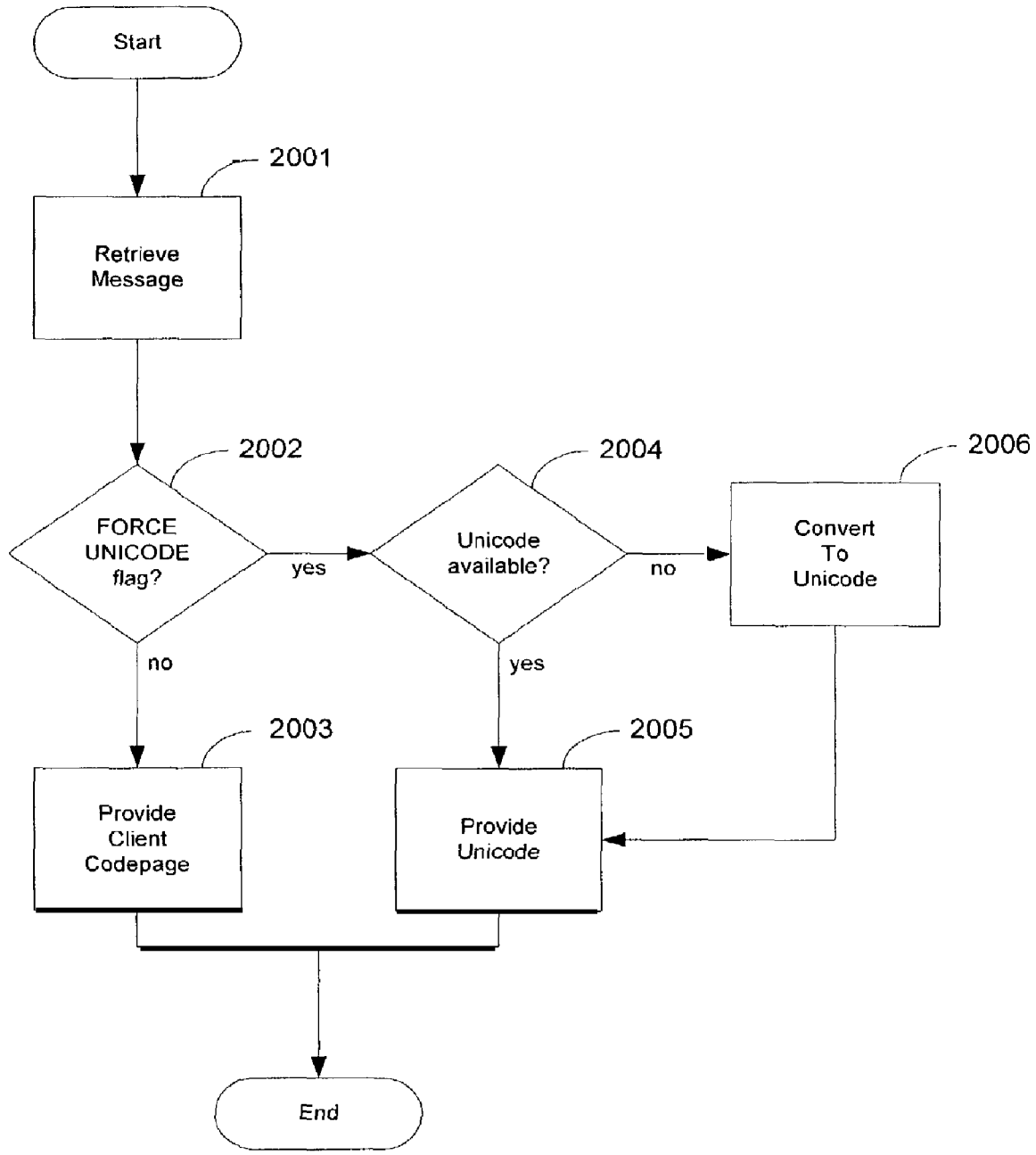
FIG. 20 is a flowchart depicting a procedure for providing an email message that uses a desired code page in accordance with an aspect of the present invention.

FIG. 20 shows steps for providing a particular character set for a message in accordance with one aspect of the present invention. Beginning at step 2001, the email server component 502 retrieves a message from its data store. At step 2002, a determination is made whether the FORCEUNICODE flag is present. If not, then step 2002 branches to step 2003, where the email server component 502 provides the email message in the email client component's designated code page, converting if necessary.

If the FORCEUNICODE flag is present, then step 2002 branches to step 2004, where a determination is made whether the message is stored as Unicode. If so, step 2004 branches to step 2005, where the message is provided to the email client component 501 in the Unicode character set. If the message is not stored in Unicode, then step 2004 branches to step 2006 where the message is converted to Unicode, and then the process continues to step 2005, where the message is provided to the email client component in Unicode.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer implemented method, comprising:
   receiving, at an email server, a request for email data objects in a folder, said request including an indication that at least one property of the email data objects is desired, said request being generated and sent by an email client; and
   accessing the folder and email data objects in the folder, and for each email data object in the folder:
   retrieving and returning the at least one property for the email data object to the email client component if the at least one property is well defined in the email data object; and
   retrieving and returning the data object to the email client component if the at least one property is not well defined for the email data object.

2. The method of claim 1, wherein the request comprises a request for synchronization of a folder in which the email data objects are located.

3. The method of claim 1, wherein the request comprises a request for a copy of email messages.

4. The method of claim 1, wherein the indication comprises a flag included with the request.

5. The method of claim 1, wherein the at least one property comprises a header for a message.

6. A computer-readable storage medium having computer-executable instructions, the instructions comprising:
- receiving a request for data objects in a folder, the request including an indication that a header of the data objects is desired, said header being a property of the data objects;
- in response to the request and the indication, accessing the folder and data objects in the folder, and for each data object in the folder:
  - retrieving and returning the header for the data object to the email client component if the data object includes the header defined by the email client component as belonging to the header set of named properties; and
  - retrieving and returning the data object to the email client component if the data object does not include the header defined by the email client component as belonging to the header set of named properties.

7. The computer-readable storage medium of claim 6, wherein the request comprises a request for synchronization of a folder in which the data objects are located.

8. The computer-readable storage medium of claim 6, wherein the request comprises a request for a copy of email messages.

9. The computer-readable storage medium of claim 6, wherein the indication comprises a flag included with the request.

10. A data packet embodied on a computer readable storage medium comprising:
- a first data field identifying an email client component
- a second data field including a request for at least one email message; and
- a third data field including an indication that the email client component desires for email messages to be in Unicode format,
- wherein, in response to receiving the data packet with the indication in the third data field, an email server component provides the Unicode format of the email message included in the request of the second data field to the email client component identified by the first data field if the email message is available in Unicode format, and converts the email message to Unicode format and provides the Unicode format to the email client component identified by the first data field if the email message included in the request of the second data field is not available in Unicode format.

11. The data packet of claim 10, wherein the indication comprises a flag included with the request.

12. The data packet of claim 10, wherein the request comprises a request for synchronization of a folder in which the email data objects are located.

13. The data packet of claim 10, wherein the request comprises a request for a copy of email messages.

14. A computer-readable storage medium having computer-executable instructions, the instructions comprising:
- receiving, from an email client component, a request for at least one email message and an indication that the email client component desires for email messages to be in Unicode format;
- in response to the request and indication, retrieving the at least one message; and
- for each email message:
  - if the email message is available in Unicode format, providing the Unicode format to the email client component; and
  - if the email message is not available in Unicode format, converting the email message to Unicode format and providing the Unicode format to the email client component.

15. The computer-readable storage medium of claim 14, wherein the indication comprises a flag included with the request.

16. The computer-readable storage medium of claim 14, wherein the request comprises a request for synchronization of a folder in which the email data objects are located.

17. The computer-readable storage medium of claim 14, wherein the request comprises a request for a copy of email messages.

18. The computer-readable storage medium of claim 14, wherein in response to receiving the Unicode format email message, the email client component converts Unicode format email message to the email client's code page.

* * * * *